US007776384B2

(12) United States Patent
Larouche et al.

(10) Patent No.: US 7,776,384 B2
(45) Date of Patent: Aug. 17, 2010

(54) METHODS AND APPARATUSES FOR DEPOSITING NANOMETRIC FILAMENTARY STRUCTURES

(75) Inventors: Frédéric Larouche, Montréal (CA); Olivier Smiljanic, Montréal (CA); Barry L. Stansfield, Saint-Bruno (CA)

(73) Assignee: Institut National de la Recherche Scientifique, Quebec (CA)

( * ) Notice: Subject to any disclaimer, the term of this patent is extended or adjusted under 35 U.S.C. 154(b) by 1117 days.

(21) Appl. No.: 11/389,255

(22) Filed: Mar. 27, 2006

(65) Prior Publication Data
US 2007/0041888 A1 Feb. 22, 2007

Related U.S. Application Data

(60) Provisional application No. 60/664,953, filed on Mar. 25, 2005.

(51) Int. Cl.
*B05D 1/12* (2006.01)
(52) U.S. Cl. .................................. 427/8; 427/9
(58) Field of Classification Search ................ 427/8–10
See application file for complete search history.

(56) References Cited

U.S. PATENT DOCUMENTS

| 5,147,998 | A | | 9/1992 | Tsantrizos et al. |
| 5,395,496 | A | | 3/1995 | Tsantrizos et al. |
| 5,643,502 | A | * | 7/1997 | Nahass et al. ............ 252/511 |
| 6,312,768 | B1 | | 11/2001 | Rode et al. |
| 6,899,945 | B2 | | 5/2005 | Smalley et al. |
| 6,979,709 | B2 | | 12/2005 | Smalley et al. |
| 2003/0211030 | A1 | | 11/2003 | Olivier et al. |
| 2004/0179989 | A1 | | 9/2004 | Height et al. |
| 2004/0246479 | A1 | * | 12/2004 | Cartlidge et al. ............ 356/335 |
| 2006/0216602 | A1 | | 9/2006 | Larouche et al. |
| 2007/0000381 | A1 | | 1/2007 | Larouche et al. |

FOREIGN PATENT DOCUMENTS

| JP | 2001-023563 | * | 1/2001 |
| WO | WO 98/39250 | | 9/1998 |
| WO | WO 01/30694 | | 5/2001 |

OTHER PUBLICATIONS

Liu, J. et al., Recent Advances in Methods of Forming Carbon Nanotubes, MRS Bulletin, vol. 24, Apr. 2004, pp. 244-250.
Sloan, J. et al., Imaging and Characterization of Molecules and One-Dimensional Crystals Formed within Carbon Nanotubes, MRS Bulletin, vol. 24, Apr. 2004, pp. 265-271.

(Continued)

*Primary Examiner*—Frederick J Parker
(74) *Attorney, Agent, or Firm*—Bereskin & Parr LLP/S.E.N.C.R.L., s.r.l.

(57) ABSTRACT

The invention relates to a method for monitoring the production of nanometric filamentary structures. The method comprises passing a gaseous phase comprising nanometric filamentary structures through a space defined between at least two electrodes generating an electric field for causing an increase of current between the electrodes and analyzing behavior of the current over a predetermined period of time and/or analyzing at least one of the size, density and shape of the nanometric filamentary structures or aggregates thereof present in the gaseous phase.

34 Claims, 24 Drawing Sheets

OTHER PUBLICATIONS

De Heer, W. A., Nanotubes and the Pursuit of Applications, MRS Bulletin, vol. 24, Apr. 2004, pp. 281-285.

Xia, Y. et al., One-Dimensional Nanostructures: Synthesis, Characterization, and Applications, Advanced Materials, vol. 15, No. 5, Mar. 4, 2003, pp. 353-389.

Liu, C. et al., Hydrogen Storage in Single-Walled Carbon Nanotubes at Room Temperature, Science, vol. 286, Nov. 5, 1999, pp. 1127-1129.

Dresselhaus, M. S. et al., Hydrogen Adsorption in Carbon Materials, MRS Bulletin, vol. 45, Nov. 1999, pp. 45-50.

Menon, M. et al., Carbon Nanotube "T Junctions": Nanoscale Metal-Semiconductor Contact Devices, Physical Review Letters, vol. 79, No. 22, Dec. 1, 1997, pp. 4453-4456.

Abrahamson, J. et al., Permanent Electric Dipoles on Gas-Suspended Particles and the Production of Filamentary Aggregates, Journal of Electrostatics, vol. 55, 2002, pp. 43-63.

Tang, Z. et al., Spontaneous Organization of Single CdTe Nanoparticles into Luminescent Nanowires, Science, vol. 297, Jul. 12, 2002, pp. 237-240.

Schleicher, B. et al., Fabrication of Aerogel-Like Structures by Agglomeration of Aerosol Particles in an Electric Field, Journal of Colloid and Interface Science, vol. 180, 1996, pp. 15-21.

Islam, M. F. et al., Direct Measurement of the Polarized Optical Absorption Cross Section of Single-Wall Carbon Nanotubes, Physical Review Letters, vol. 93, No. 3, Jul. 16, 2004, pp. 037404-1-037404-4.

Lushnikov, A. A. et al., Experimental Observation of the Aerosol-Aerogel Transition, Chemical Physics Letters, vol. 175, Nov. 30, 1990, pp. 138-142.

Chiang, I. W. et al., Purification and Characterization of Single-Wall Carbon Nanotubes (SWNTs) Obtained from the Gas-Phase Decomposition of CO (HiPco Process), Journal of Physical Chemistry, vol. 105, Aug. 10, 2001, pp. 8297-8301.

Zhou, W. et al., Structural Characterization and Diameter-Dependent Oxidative Stability of Single Wall Carbon Nanotubes Synthesized by the Catalytic Decomposition of CO, Chemical Physics Letters, vol. 350, Dec. 14, 2001, pp. 6-14.

Thien-Nga, L. et al., Mechanical Purification of Single-Walled Carbon Nanotube Bundles from Catalytic Particles, Nano Letters, vol. 2, No. 12, Nov. 2, 2002, pp. 1349-1352.

Smiljanic, O. et al., Gas-Phase Synthesis of SWNT by an Atmospheric Pressure Plasma Jet, Chemical Physics Letters, vol. 356, Apr. 22, 2002, pp. 189-193.

Harbec, D. et al., Carbon Nanotubes from the Dissociation of $C_2Cl_4$ Using a DC Thermal Plasma Torch, Journal of Physics D: Applied Physics, vol. 37, Jul. 14, 2004, pp. 2121-2126.

Hahn, J. et al., Selective Synthesis of High-Purity Carbon Nanotubes by Thermal Plasma Jet, Carbon, vol. 42, Aug. 14, 2004, pp. 3003-3042.

Cota-Sanchez, G. et al., Induction Plasma Synthesis of Fullerenes and Nanotubes Using Carbon Black-Nickel Particles, Carbon, vol. 43, Aug. 1, 2005, pp. 3153-3166.

\* cited by examiner

FIG_1

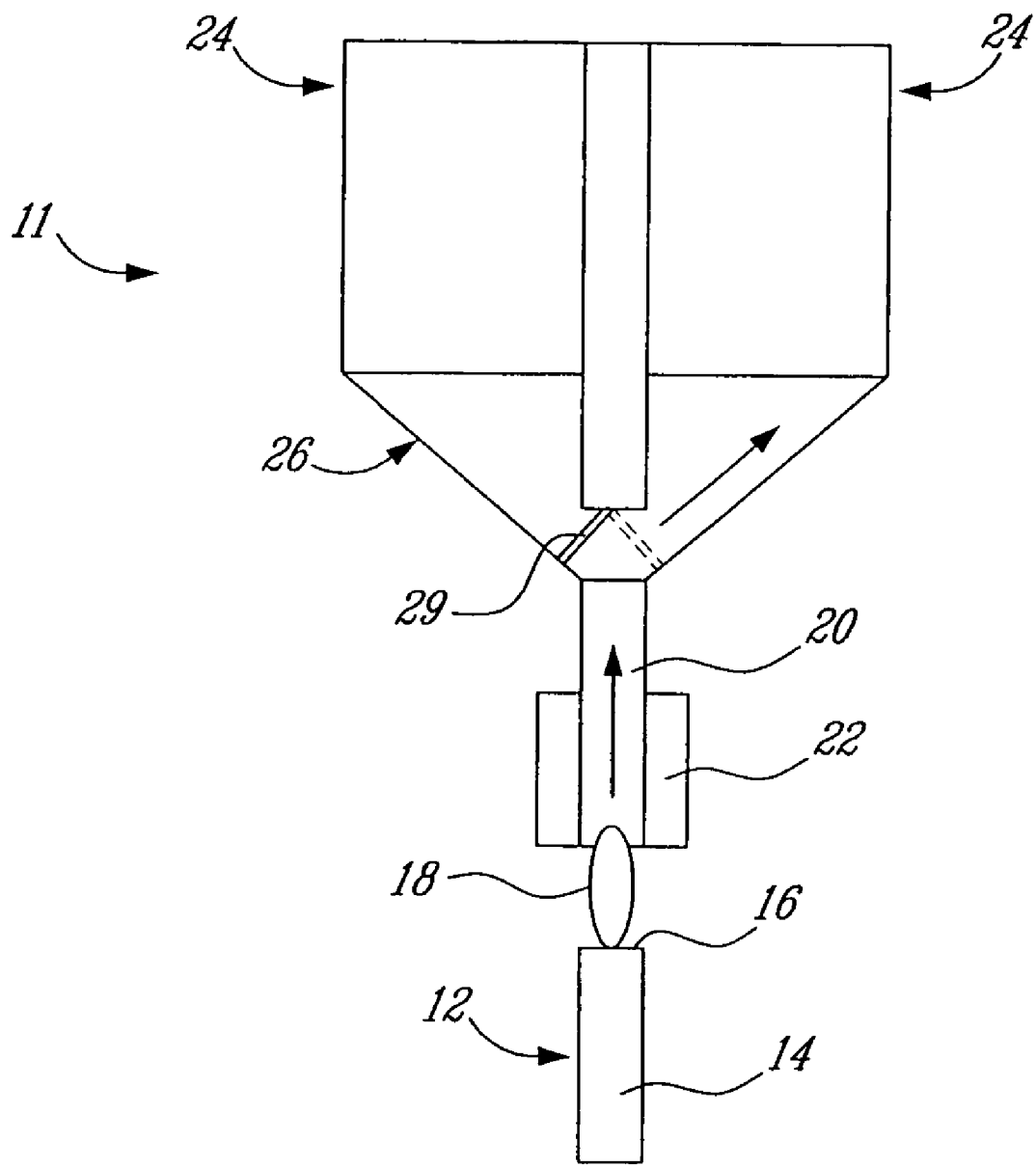
FIG_3

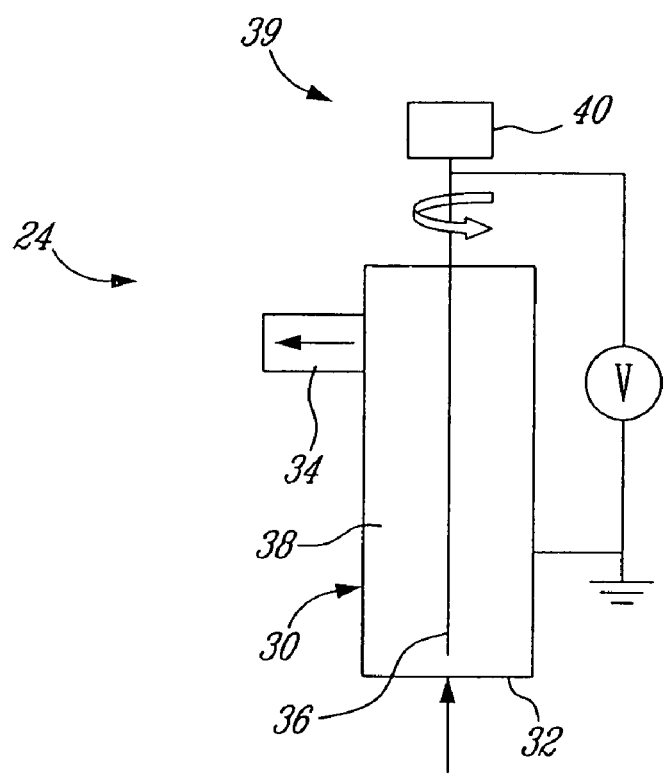
FIG_4
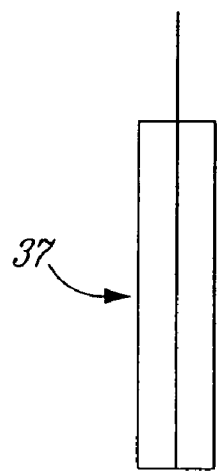
FIG_5

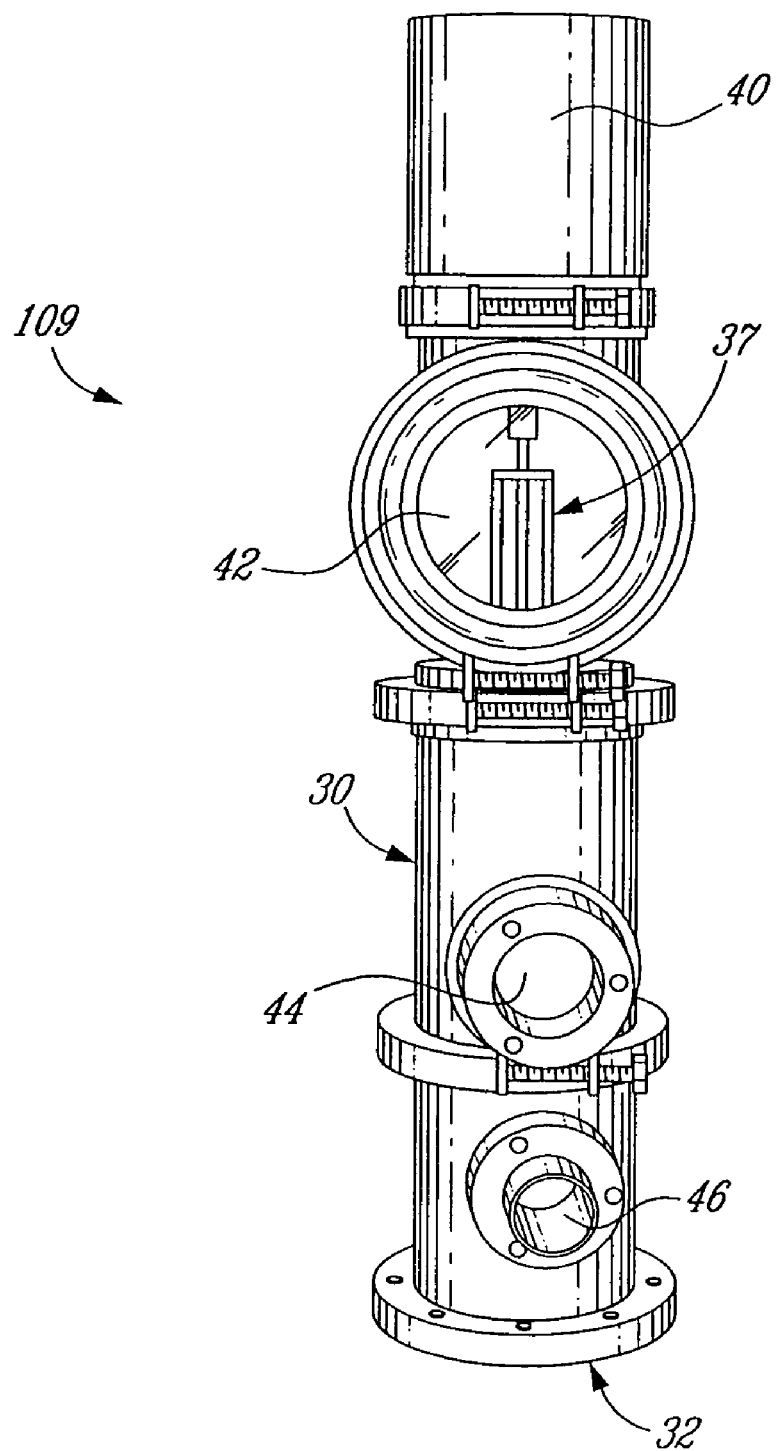
FIG_6

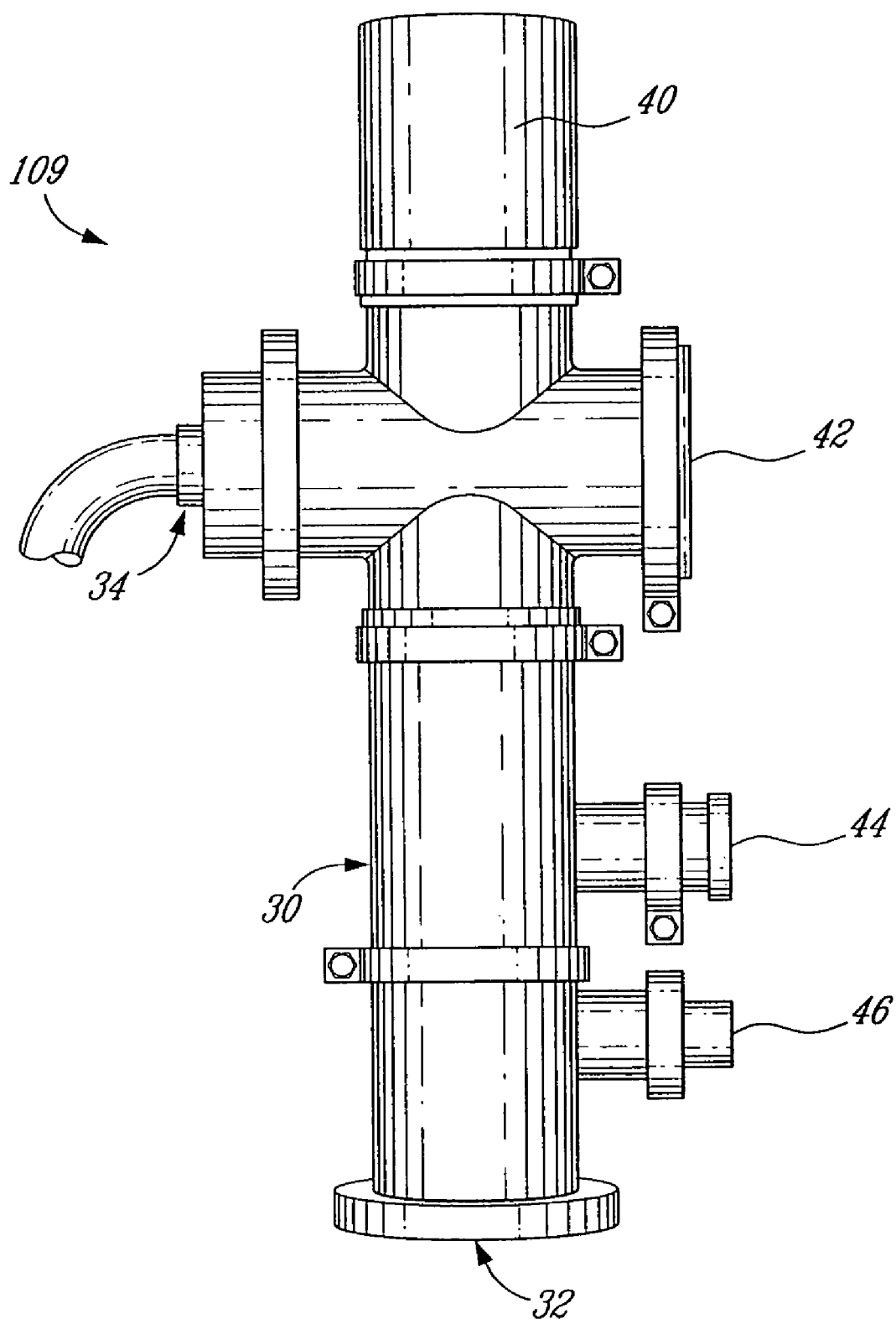
FIG_7

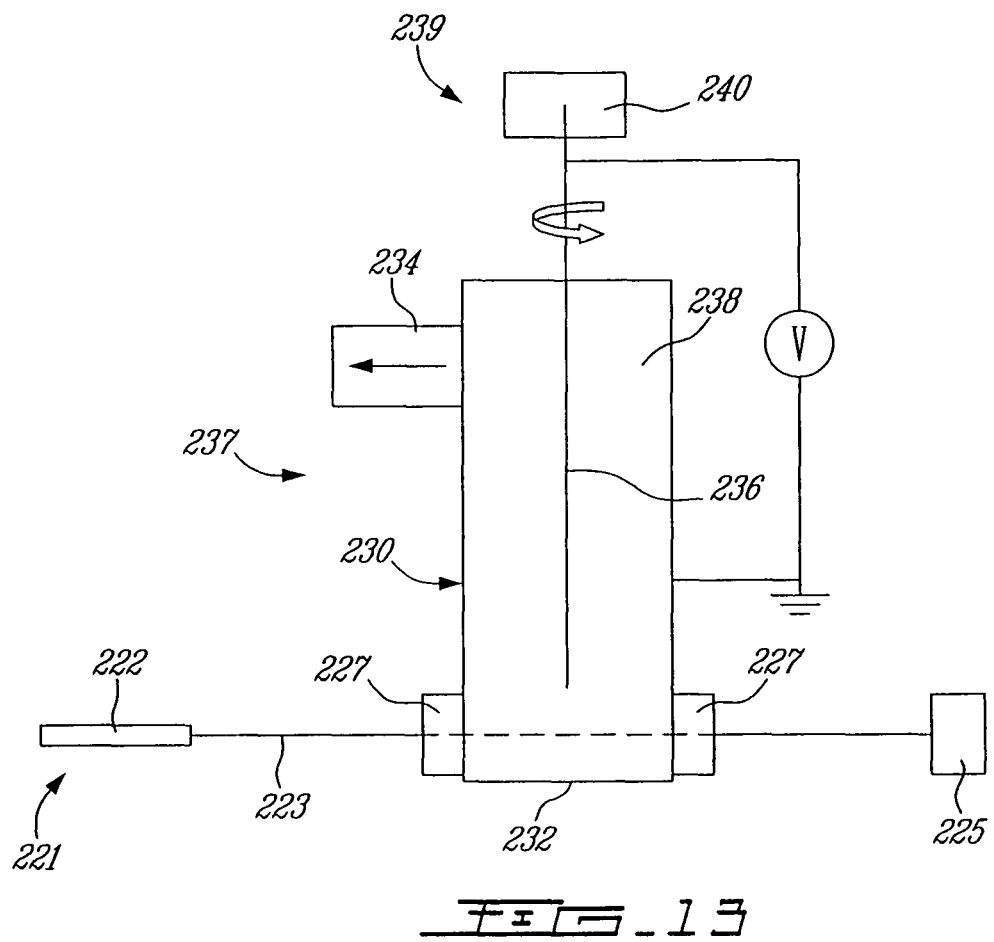
FIG_13
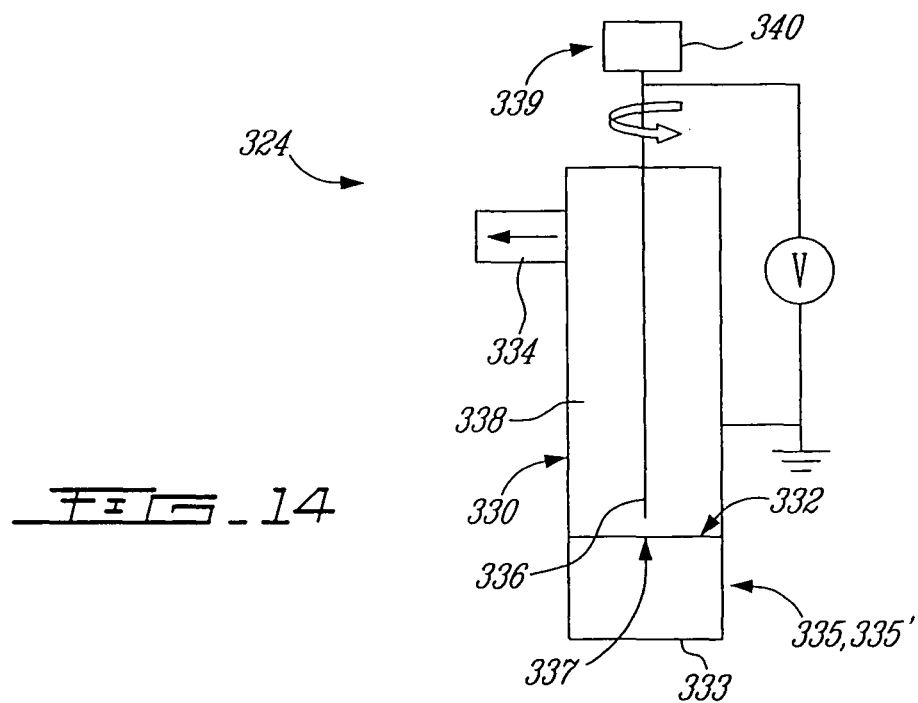
FIG_14

FIG_17

METHODS AND APPARATUSES FOR DEPOSITING NANOMETRIC FILAMENTARY STRUCTURES

CROSS-REFERENCE TO RELATED APPLICATION

The present application claims priority on U.S. provisional application No. 60/664,953 filed on Mar. 25, 2005, which is incorporated herein by reference in its entirety.

FIELD OF THE INVENTION

The present invention relates to improvements in the field of nanometric filamentary structures production. More particularly, the invention relates to methods and apparatuses for depositing nanometric filamentary structures such as single-wall carbon nanotubes or multi-wall carbon nanotubes. It also relates to various other methods and apparatuses that can be useful in the production of nanometric filamentary structures as well as to macroscopic assemblies of such nanometric filamentary structures.

BACKGROUND OF THE INVENTION

In the last decade, several nanometric filamentary structures have been synthesized. In fact, the interest for these one-dimensional structures has considerably grown. Several efforts and progress have been made in the synthesis, property characterization, assembly and applications of these one-dimensional structures. Some of these recent developments have been reported in (J. Liu, S. Fan and H. Dai, J, MRS Bull. 24 (2004), 244; J. Sloan et al., MRS Bull. 24 (2004), 265; Walt A. de Heer, MRS Bull. 24 (2004), 281; Y. Xia et al., Advanced Materials 15 (2003), 353.), which are hereby incorporated by reference in their entirety. However, there is still room for improvement in the proposed methods. Since many of these nanometric filamentary structures can be particularly volatile, they are difficult to deposit or recover without loosing at least a portion of them. Up to now, the deposition of nanometric filamentary structures has mostly been realized by thermophoresis. Such a technique generally requires large water-cooled surfaces, acting as collector of the product. Such a technique is not optimized for a large-scale production and often results in a deposit having a powder or membrane form that is relatively difficult to recover. It would therefore be desirable to be provided with a method and apparatus that would prevent such drawbacks.

Among these one-dimensional nanometric filamentary structures, carbon nanotubes have demonstrated very interesting properties. Carbon nanotubes are available either as multi-wall or single-wall nanotubes. Multi-wall carbon nanotubes have exceptional properties such as excellent electrical and thermal conductivities. They have applications in numerous fields such as storage of hydrogen (C. Liu, Y. Y. Fan, M. Liu, H. T. Cong, H. M. Cheng, M. S. Dresselhaus, Science 286 (1999), 1127; M. S. Dresselhaus, K. A Williams, P. C. Eklund, MRS Bull. (1999), 45) or other gases, adsorption heat pumps, materials reinforcement or nanoelectronics (M. Menon, D. Srivastava, Phy. Rev. Lett. 79 (1997), 4453). Single-wall carbon nanotubes, on the other hand, possess properties that are significantly superior to those of multi-wall nanotubes. For any industrial application such as storage or material reinforcement, the amount of single-wall carbon nanotubes produced must be at least a few kilograms per day. A difficulty encountered with the synthesis of single-wall carbon nanotubes, especially for their recovery, is that they are very volatile and they can be lost during the synthesis. By using the known methods of producing single-wall nanotubes, a powder or membrane form is obtained and large flows of cooling fluid are required in order to deposit the nanotubes carried in the gas.

In the methods and apparatuses that have been proposed so far for producing nanometric filamentary structures, there is no proposed solution that is efficient in order to determine the quality and/or quantity of the produced structures during the synthesis, In fact, such an analysis is made only when the production is stopped. There is thus no reliable way, during a synthesis, to determine if a given amount of structures already produced is getting contaminated with structures of poor quality. There is also no reliable way to determine if the efficiency of the production (i.e. the quantity of structures produced) is maintained during all the process or if it is lowered or considerably diminished at a certain time.

With respect to the synthesis of nanometric filamentary structures, many methods have been proposed in which the structures are deposited on a cooled surface such as a metallic plate. However, when using such methods, it results in the formation of a powder and large flows of cooling fluid are required. In fact, several types of nanometric filamentary structures have tendency to be fine powder or membranes compounds that are complicated to recover and have also tendency to be dissipated in the air.

U.S. Pat. No. 6,899,945 describes a three-dimensional single-wall carbon nanotube solid block material so-called buckyrock material. Such a material is described as being very solid, rigid and generally inflexible, and effective for use in armor. This document describes that such a material has a density of $0.7205\ g/cm^3$.

U.S. Pat. No. 6,979,709 describes a macroscopic carbon fiber comprising at least about $10^6$ single-wall carbon nanotubes bundled together in generally parallel orientation. The single-wall carbon nanotubes are arranged in a regular triangular lattice, i.e. in a close-packed structures. Such a macroscopic carbon fiber is obtained by a growth technique in which the hemispheric fullerene cap is removed from the upper ends of the tubular carbon molecules in the array, and the upper ends of the tubular carbon molecules in the array are then contacted with a catalytic metal. A gaseous source of carbon is supplied to the end of the array while localized energy is applied to the end of the array in order to heat the end to a temperature in the range of about 500° C. to about 1300° C. The growing carbon fiber is continuously recovered.

Another major drawback in the synthesis of carbon nanotubes is that the methods that have been proposed so far are not continuous. In fact, to obtain a continuous method for producing carbon nanotubes, the synthesis and the deposition and/or recovery must be carried out in a continuous manner.

SUMMARY OF THE INVENTION

According to one aspect of the invention, there is provided a method for depositing nanometric filamentary structures, the method comprising:

passing a gaseous phase or gaseous composition comprising the nanometric filamentary structures through a space defined between at least two electrodes generating an electric field, for depositing the nanometric filamentary structures on at least one of the electrodes; and at least substantially preventing the deposited nanometric filamentary structures from bridging the electrodes during the deposition.

According to another aspect of the invention, there is provided a method for depositing nanometric filamentary structures, the method comprising:

a) providing a set of electrodes comprising at least two electrodes, a first electrode and a second electrode defining a space therebetween;

b) applying a potential difference between the electrodes in order to generate an electric field;

c) passing a gaseous phase comprising the nanometric filamentary structures through the space for depositing the nanometric filamentary structures on at least one of the electrodes; and d) substantially preventing the deposited nanometric filamentary structures from bridging the electrodes during the deposition.

According to another aspect of the invention, there is provided a method for depositing nanometric filamentary structures, the method comprising:

passing a gaseous phase comprising the nanometric filamentary structures through a space defined between at least two electrodes generating an electric field, for depositing the nanometric filamentary structures on at least one of the electrodes; and substantially removing, during the deposition of the nanometric filamentary structures, any structures that are bridging the at least two electrodes from such a position by removing at least a portion of these structures from contacting one of the electrodes.

According to another aspect of the invention, there is provided a method for depositing nanometric filamentary structures, the method comprising:

passing a gaseous phase comprising the nanometric filamentary structures through a space defined between at least two electrodes generating an electric field, for depositing the nanometric filamentary structures on at least one of the electrodes; and substantially removing, during the deposition of the nanometric filamentary structures, any structures which are in contact simultaneously with at least two electrodes from such a position by removing at least a portion of these structures from contacting one of the electrodes.

According to another aspect of the invention, there is provided a method for depositing nanometric filamentary structures, the method comprising:

a) providing a set of electrodes comprising at least two electrodes, a first electrode and a second electrode defining a space therebetween;

b) applying a potential difference between the electrodes in order to generate an electric field; and c) passing a gaseous phase comprising the nanometric filamentary structures through the space for depositing the nanometric filamentary structures on at least one of the electrodes, wherein during the deposition of the nanometric filamentary structures, substantially removing any structures that are bridging at least two electrodes from such a position by removing at least a portion of these structures from contacting one of the electrodes.

It was found that by using the five methods of depositing nanometric filamentary structures of the present invention, it is possible to considerably facilitate the production of such structures by providing their efficient deposition and simple recovery. In fact, it was demonstrated that by using such methods, it is possible to improve the productivity of methods and apparatuses for producing nanometric filamentary structures by permitting to rapidly recover the nanometric filamentary structures and carry out such a task at a low cost. Using the methods of the present invention for depositing nanometric filamentary structures permits to produce the structures over a prolonged period of time as compared to the solutions proposed in the prior art. Particularly, when using a method in which the electrodes are at least substantially prevented from being bridged by the structures, a lot of incidents such as short-circuits, clogging, jamming are avoided, thereby permitting to carry out the process (production of the nanometric filamentary structures) over prolonged periods of time. Therefore, the costs for producing such structures are significantly lowered.

According to another aspect of the invention, there is provided a continuous method for depositing nanometric filamentary structures. The method comprises a) providing an apparatus comprising:

an inlet;

a valve comprising an inlet and at least two outlets, the outlets being adapted to be selectively put in fluid flow communication with the inlet of the valve, the inlet of the valve being in fluid flow communication with the inlet of the apparatus;

at least two depositing units each of the units comprising a set of at least two electrodes, a first electrode and a second electrode defining a space therebetween, the space being in fluid flow communication with one of the outlets of the valve and being dimensioned to receive a gaseous phase comprising the nanometric filamentary structures;

b) passing the gaseous phase through the inlet of the apparatus, the valve and a selected depositing unit; and applying a potential difference between the electrodes of the selected depositing unit to thereby deposit nanometric filamentary structures on at least one electrode; and c) selecting another depositing unit and repeating step (b).

According to another aspect of the invention, there is provided a continuous method for depositing nanometric filamentary structures on electrodes. The method comprises passing a gaseous phase comprising the nanometric filamentary structures between at least two electrodes of a selected a set of electrodes (i.e. first set) generating an electric field for depositing the nanometric filamentary structures on at least one of the electrodes of the set; and then, at a desired time, selecting another set of electrodes (i.e. second set) comprising at least two electrodes and passing therebetween the gaseous phase for depositing the nanometric filamentary structures on at least one of the electrodes of the other set. The method preferably comprises the step of recovering the deposited structures from the set of electrodes while depositing structures between the other set of electrodes. The person skilled in the art would understand that such a method can be performed if there are at least two sets of electrodes. It can advantageously be carried out by using a plurality of different sets of electrodes (preferably 3 to 10, more preferably 4 to 8) so that it is possible to recover in due time the deposited material from sets of electrodes while depositing the structures into other sets. It is also possible to more efficiently separate different samples or batches of deposited structures, which may have different level of purity. In fact, during a process for producing such structures, the quality, size, and other properties are preferably maintained as constant as possible.

It was found that by using the latter two methods, it is possible to deposit, in a continuous manner, the nanometric filamentary structures such as those produced during a gas-phase synthesis. By using such a method it is possible to carry out the production and recovery of the deposited nanometric filamentary structures without stopping their production or without turning off the apparatus used to produce them in a gas-phase synthesis.

According to another aspect of the invention, there is provided a method for recovering nanometric filamentary structures, the method comprising:

passing a gaseous phase comprising the nanometric filamentary structures through a space defined between at least two electrodes generating an electric field, for depositing the nanometric filamentary structures on at least one of the electrodes; and collecting, under an inert atmosphere, the deposited nanometric filamentary structures from at least one of the electrodes.

The method can further comprise the packaging of the nanometric filamentary structures under inert atmosphere. The method can also comprise the turning off of the potential difference between the electrodes before carrying out the collecting step. During the deposition step of the nanometric filamentary structures, any structures that are bridging at least two electrodes can be substantially removed from such a position by removing at least a portion of these structures from contacting one of the electrodes. Alternatively, this method can further comprise the step of preventing the deposited nanometric filamentary structures from bridging the electrodes during the deposition. The method can further comprise the step of analyzing behavior of the current over a predetermined period of time and/or analyzing size, density or shape of the nanometric filamentary structures or aggregates thereof.

It was found that by using the latter method, it is possible to deposit the nanometric filamentary structures on electrodes thereby recovering a satisfying portion of the nanometric filamentary structures produced during a gas-phase synthesis. It was also found that such a method permits to avoid modifying the produced structures properties by considerably reducing the risks of exposing them to oxygen or moisture.

According to a further aspect of the invention, there is provided an apparatus for depositing nanometric filamentary structures comprising:

a housing which is preferably an elongated member, the elongated member defining an internal bore, an inlet and an outlet, the inlet and the outlet being in fluid flow communication with the bore, and a first electrode and a second electrode disposed in the internal bore, the first and second electrodes defining therebetween a space dimensioned to receive a gaseous phase comprising the nanometric filamentary structures, the first electrode being connected to the elongated member and the second electrode being connected to a supporting member adjacent to the elongated member, the electrodes being adapted to generate an electric field for depositing the nanometric filamentary structures on at least one of them.

It was found that by using the latter apparatus, it is possible to recover a satisfying portion of the nanometric filamentary structures produced during a gas-phase synthesis.

According to a further aspect of the invention, there is provided an apparatus for depositing nanometric filamentary structures comprising:

a housing defining an internal bore, an inlet and an outlet, the inlet and the outlet being in fluid flow communication with the bore;

a first electrode and a second electrode disposed in the internal bore, the first and second electrodes defining therebetween a space dimensioned to receive a gaseous phase comprising the nanometric filamentary structures, the first electrode being connected to the housing and the second electrode being connected to a supporting member adjacent to the housing, the electrodes being adapted to generate an electric field for depositing the nanometric filamentary structures on at least one of the electrodes; and an ionization unit comprising means for generating a current, an induced current or a photoionization, and being in fluid flow communication with the bore and upstream of the first and second electrodes, the unit being effective for ionizing the structures before they are received and polarized within the space It was found that by using the latter apparatus, it is possible to recover a satisfying portion of the nanometric filamentary structures produced during a gas-phase synthesis. In particular, it was found that such an ionization unit facilitates their aggregation or deposition.

According to a further aspect of the invention, there is provided an apparatus for depositing nanometric filamentary structures comprising:

a housing defining an internal bore, an inlet and an outlet, the inlet and the outlet being in fluid flow communication with the bore;

a first electrode and a second electrode disposed in the internal bore, the first and second electrodes defining therebetween a space dimensioned to receive a gaseous phase comprising the nanometric filamentary structures, the first electrode being connected to the housing and the second electrode being connected to a supporting member adjacent to the housing, the electrodes being adapted to generate an electric field for depositing the nanometric filamentary structures on at least one of the electrodes; and means for at least substantially preventing the deposited nanometric filamentary structures from bridging the electrodes.

According to a further aspect of the invention, there is provided an apparatus for depositing nanometric filamentary structures comprising:

at least two electrodes defining therebetween a space dimensioned to receive a gaseous phase comprising the nanometric filamentary structures, the electrodes being adapted to generate an electric field for depositing the nanometric filamentary structures on at least one of the electrodes; and means for at least substantially preventing the deposited nanometric filamentary structures from bridging the electrodes.

According to a further aspect of the invention, there is provided an apparatus for depositing nanometric filamentary structures comprising:

a housing defining an internal bore, an inlet and an outlet, the inlet and the outlet being in fluid flow communication with the bore; and a first electrode and a second electrode disposed in the internal bore, the first and second electrodes defining therebetween a space dimensioned to receive a gaseous phase comprising the nanometric filamentary structures, the first electrode being connected to the housing and the second electrode being connected to a supporting member adjacent to the housing, the electrodes being in rotation relation to one another and being adapted to generate an electric field for depositing the nanometric filamentary structures on at least one of the electrodes.

It was found that by using the latter three apparatuses, it is possible to deposit nanometric filamentary structures over a prolonged period of time as compared to the methods of the prior art. By using such apparatuses, it is possible to considerably facilitate the production of such structures by permitting their efficient deposition and simple recovery. These apparatuses permit to improve the productivity of apparatuses for producing nanometric filamentary structures by permitting to rapidly recover the nanometric filamentary structures and carry out such a task at low cost. Particularly, when using a method in which the electrodes are at least substantially prevented from being bridged by the structures, a lot of incidents such as short-circuits, clogging, jamming are avoided, thereby permitting to carry out the process (production of the nanometric filamentary structures) over prolonged period of time. The costs for producing such structures are thus significantly lowered.

According to a further aspect of the invention, there is provided an apparatus for depositing nanometric filamentary structures comprising:

at least one inlet dimensioned to receive a gaseous phase comprising the nanometric filamentary structures;

at least one selecting device comprising an inlet and at least two outlets, the outlets being adapted to be selectively put in fluid flow communication with the inlet of the selecting device, the inlet of the selecting device being in fluid flow communication with the inlet of the apparatus; and at least two depositing units each of the units comprising a set of at least two electrodes, a first electrode and a second electrode defining therebetween a space dimensioned to receive the gaseous phase, the space being in fluid flow communication with one outlet of the selecting device, the electrodes being adapted to generate an electric field for depositing the nanometric filamentary structures on at least one of them.

It was found that by using the latter apparatus, it is possible to deposit and recover nanometric filamentary structures in a continuous manner. In other words, it is possible to carry out the production in a continuous manner. By using such apparatuses, it is possible facilitate the production of such structures by permitting their efficient deposition and simple recovery. These apparatuses improve the productivity of apparatuses for producing nanometric filamentary structures by permitting to rapidly recover the nanometric filamentary structures and carry out such a task at low cost.

According to a further aspect of the invention, there is provided a method for forming aggregates of nanometric filamentary structures comprising passing a gaseous phase comprising the nanometric filamentary structures through a space defined between at least two electrodes generating an electric field so as to aggregate the nanometric filamentary structures in the gaseous phase. The method can further comprise the step of condensing the aggregates and/or depositing the aggregates on a surface.

According to another aspect of the invention, there is provided a method for depositing nanometric filamentary structures, the method comprising passing a gaseous phase or gaseous composition comprising the nanometric filamentary structures through a space defined between at least two electrodes generating an electric field, for depositing the nanometric filamentary structures on at least one of the electrodes, wherein before depositing the nanometric filamentary structures, the structures are at least partially ionized in order to polarize them, thereby facilitating their aggregation or deposition. Ionization preferably permits to at least partially ionize the structures.

According to another aspect of the invention, there is provided a method for depositing nanometric filamentary structures, the method comprising at least partially ionizing nanometric filamentary structures comprised in a gaseous phase in order polarize the structures, and passing the gaseous phase through a space defined between at least two electrodes generating an electric field, for depositing the nanometric filamentary structures on at least one of the electrodes.

According to a further aspect of the invention, there is provided a method for producing nanometric filamentary structures comprising the steps of producing the nanometric filamentary structures, depositing the nanometric filamentary structures and then recovering the nanometric filamentary structures, the improvement wherein before depositing the nanometric filamentary structures, ionizing the structures in order to polarize them, thereby facilitating their aggregation or deposition. Ionization preferably permits to at least partially ionize the structures.

According to a further aspect of the invention, there is provided a method for producing nanometric filamentary structures comprising the steps of producing the nanometric filamentary structures, depositing the nanometric filamentary structures and then recovering the nanometric filamentary structures, the improvement wherein before depositing the nanometric filamentary structures, monitoring in real time the production of the structures by introducing into a monitoring chamber, when desired and during a selected period of time, a portion of the produced structures in order to analyze in a quantitative and/or qualitative manner the production of the structures by means of the current behavior and/or an optical probe. The analysis can be made respectively by verifying the evolution of the current behavior and/or the transmitted power as a function of time.

According to a further aspect of the invention, there is provided a device for producing nanometric filamentary structures comprising a depositing chamber whereat the structures are formed, the improvement wherein the depositing chamber is coupled to a monitoring chamber comprising (i) means for allowing or not the passage of the structures into the monitoring chamber for monitoring, in real time, when desired, the production of the structures, (ii) means for allowing the structures to exit from the monitoring chamber when desired, and (iii) an optical probe for sensing the structures.

According to another aspect of the invention, there is provided a method for monitoring the production of nanometric filamentary structures, the method comprising:

passing a gaseous phase comprising the nanometric filamentary structures through a space defined between at least two electrodes generating an electric field, for causing an increase of the current between the electrodes; and analyzing behavior of the current over a predetermined period of time and/or analyzing size, density or shape of nanometric filamentary structures or aggregates thereof. The results obtained from the analysis can then be compared with standard graphs in order to determine the quality and/or quantity of structures produced.

According to a further aspect of the invention, there is provided a method for monitoring the production of nanometric filamentary structures. The method comprises sensing a gaseous phase comprising the nanometric filamentary structures in order to analyze in a quantitative manner the structures that are carried in the gaseous phase. The analysis is preferably carried out by analyzing the density of the nanometric filamentary structures suspended in the gas phase. The analysis of the density of the nanometric filamentary structures is preferably carried out by analyzing the optical absorption of the nanometric filamentary structures present in the gaseous phase. The sensing is preferably carried out in real time. The sensing step is also preferably carried out by using an optical probe.

According to a further aspect of the invention, there is provided a method for monitoring the formation of nanometric filamentary structures during the production of the structures. The method comprises sensing, in real time, a sample of the produced nanometric filamentary structures by means of an optical probe in order to analyze the structures. The analysis can be carried out by analyzing the density of the nanometric filamentary structures. The sensing step can be carried out in a monitoring chamber which is a different chamber than a production chamber or device whereat the structures are produced. It can also be carried out upstream the inlet of the production chamber, in a region where there is no electric field, to monitor the production rate of the apparatus for producing nanometric filamentary structures.

It was found that by using the latter three methods, it is possible to monitor in real time and detect the presence of the nanometric filamentary structures in the gaseous phase. Such methods are particularly useful since they permit to evaluate the quality and/or quantity of the structures produced in real time and to stop the production at a selected time if the quality and/or quantity of the so-produced structures at the selected time does not meet certain requirements.

According to a further aspect of the invention, there is provided an apparatus for monitoring the production of nanometric filamentary structures, the apparatus comprising:

a housing defining an internal bore adapted to receive the structures and having an inlet and an outlet in communication with the bore; and means, in fluid flow communication with the bore, for analyzing behavior of the current over a predetermined period of time.

The means for analyzing the behavior of the current can comprise a set of electrodes comprising at least two electrodes. The apparatus can further comprise a means for analyzing size, density or shape of the nanometric filamentary structures or aggregates thereof such as a camera or an optical probe. The optical probe can be selected from the group consisting of a laser beam, an infrared light beam, a visible light beam or an ultraviolet light beam and mixtures thereof. The means for analyzing size, density or shape of the structures or aggregates thereof can be disposed within the bore or adjacently to the bore. The means for analyzing size, density or shape of the structures or aggregates thereof can also be disposed within the inlet of the apparatus. The inlet can be adapted to be in fluid flow communication, when desired, with an apparatus for producing the nanometric filamentary structures. The inlet can comprise a valve which permits to selectively permit or not, communication between the internal chamber and the apparatus for producing nanometric filamentary structures.

According to a further aspect of the invention, there is provided an apparatus for monitoring the production of nanometric filamentary structures, the apparatus comprising:

a housing defining an internal bore adapted to receive the structures and having an inlet and an outlet in communication with the bore; and means for analyzing size, density or shape of the nanometric filamentary structures or aggregates thereof in a gaseous phase.

The means for analyzing the density of the nanometric filamentary structures can comprise an optical probe. The optical probe can be selected from the group consisting of a laser beam, an infrared light beam, a visible light beam or an ultraviolet light beam and mixtures thereof. The inlet can be adapted to be in fluid flow communication, when desired, with an apparatus for producing the nanometric filamentary structures. The inlet can comprise a valve which permits to selectively permit or not, communication between the internal chamber and the apparatus for producing nanometric filamentary structures. The means for analyzing the structures or aggregates thereof can be disposed within the bore or adjacently to the bore. The means for analyzing the structures or aggregates thereof can also be disposed within the inlet of the apparatus. The apparatus can further include a set of electrodes, which comprises at least two electrodes.

According to a further aspect of the invention, there is provided an apparatus for monitoring the production of nanometric filamentary structures, the apparatus comprising:

a housing defining an internal bore adapted to receive the structures and having an inlet and an outlet in communication with the bore;

means for analyzing size, density or shape of the nanometric filamentary structures or aggregates thereof in a gaseous phase;

means, in fluid flow communication with the bore, for analyzing the behavior of the current over a predetermined period of time It was found that by using the latter three apparatuses, it is possible to monitor in real time and detect the presence of the nanometric filamentary structures in the gaseous phase. These apparatuses are particularly useful since they permit to evaluate the quality and/or quantity of the structures produced in real time and to stop the production at a selected time if the quality and/or quantity of the so-produced structures at the selected time does not meet certain requirements.

According to one aspect of the invention, there is provided a method for depositing nanometric filamentary structures, comprising passing a gaseous phase comprising the nanometric filamentary structures through a space defined between at least two electrodes generating an electric field, thereby depositing the nanometric filamentary structures on at least one of the electrodes.

According to another aspect of the invention, there is provided a method for depositing nanometric filamentary structures on electrodes, comprising the steps of:

a) providing a set of electrodes comprising at least two electrodes, a first electrode and a second electrode defining a space therebetween;

b) applying a potential difference between the electrodes in order to generate an electric field; and c) passing a gaseous phase comprising the nanometric filamentary structures through the space, thereby depositing the nanometric filamentary structures on at least one of the electrodes.

It was found that by using the latter two methods, it is possible to recover a satisfying portion of the nanometric filamentary structures produced during a gas-phase synthesis.

It was also found that the methods and apparatuses of the present invention are very versatile since the can be used in combination with a plurality of methods and apparatuses for preparing nanometric filamentary structures. In fact, the methods and apparatuses of the present invention can be used with plasma torches (RF, or induction plasma torches, transferred arcs plasma torches, DC plasma torches, microwaves plasma torches etc.), HiPco, laser vaporization, gas-phase chemical vapor deposition, laser ablation and electric arc, actually, any gas-phase synthesis of 1 D nanostructures. The methods and apparatuses of the present invention can be used in combination with purifying methods and apparatuses as defined in U.S. 60/664,952 filed on Mar. 25, 2005 and in an international application (PCT/CA) entitled Methods and Apparatuses for Purifying Carbon Filamentary Structures filed on Mar. 23, 2006, which are hereby incorporated by reference in their entirety.

According to another aspect of the present invention, there is provided a macroscopic assembly of nanometric filamentary structures. The macroscopic assembly comprises a plurality of microscopic assemblies of nanometric filamentary structures substantially aligned in a same direction and connected or assembled together. Each of the microscopic assemblies comprises a plurality of members defining therebetween a plurality of spaces or voids. Each of the members comprises at least one nanometric filamentary structure or at least one bundle of nanometric filamentary structures. The macroscopic assembly has a density of less than 8 mg/cm$^3$.

According to another aspect of the present invention, there is provided a macroscopic assembly of nanometric filamentary structures. The assembly comprises a plurality of microscopic assemblies of nanometric filamentary structures substantially aligned in a same direction and connected together. Each of the microscopic assemblies comprises a plurality of members defining therebetween a plurality of spaces or voids. Each of the members comprises at least one nanometric filamentary structure or at least one bundle of nanometric filamentary structures, wherein the macroscopic assembly is in the form of a foam.

According to another aspect of the present invention, there is provided a macroscopic assembly of nanometric filamentary structures. The macroscopic assembly comprises a plurality of microscopic assemblies of nanometric filamentary structures substantially aligned in a same direction and connected or assembled together. Each of the microscopic assemblies comprises a plurality of members defining therebetween a plurality of spaces or voids. Each of the members comprises at least one nanometric filamentary structure or at least one bundle of nanometric filamentary structures. The bundles have a diameter of less than 100 nm.

It was found that the macroscopic assemblies of nanometric filamentary structures of the present invention have unique properties. These assemblies have a particularly low density that provides them a foamy aspect. These assemblies also comprise a considerably high amounts of voids or interstices and they thus have a high porosity and a high specific area. The macroscopic assemblies of nanometric filamentary structures of the present invention also have a high absorbance. Such features and particular properties render them particularly interesting for applications such as catalyst support, supercapacitor membrane, filter membrane, lithium battery electrodes, fuel cell electrodes, Ni/MH battery electrodes and dispersion into a matrix material such as a polymer matrix to make composite material, etc. They could also be used, in view of their foamy aspect, for replacing various catalysts used as example in electrochemistry. It was also found that such macroscopic assemblies of nanometric filamentary structures with a high volume can be clearly and rapidly distinguished from usual nanometric filamentary structures that are often in a powder or membrane form such as single wall carbon nanotubes. In fact, the macroscopic assemblies, of the present invention, are in the form of a foam, which clearly contrasts with a powder or membrane form. It was found that such a foam form minimizes the health risk associated with the manipulation of the product, since they have less tendency to be volatilized.

According to another aspect of the present invention, there is provided a foam comprising a macroscopic assembly of nanometric filamentary structures. The macroscopic assembly comprises a plurality of microscopic assemblies of nanometric filamentary structures substantially aligned in a same direction and connected together. Each of the microscopic assemblies comprises a plurality of members defining therebetween a plurality of spaces or voids. Each of the members comprises at least one nanometric filamentary structure or at least one bundle of nanometric filamentary structures. The bundles have a diameter of less than 100 nm.

According to another aspect of the present invention, there is provided a filament comprising a macroscopic assembly of nanometric filamentary structures as defined in the present invention.

According to another aspect of the present invention, there is provided a filament comprising a macroscopic assembly of nanometric filamentary structures. The macroscopic assembly comprises a plurality of microscopic assemblies of nanometric filamentary structures connected to one another. Each of the microscopic assemblies comprises a plurality of members substantially aligned in a same direction, the members defining therebetween a plurality of spaces or voids. Each of the members comprises at elast one nanometric filamentary structure or at least one bundle of nanometric filamentary structures. The bundles have a diameter of less than 100 nm.

According to another aspect of the present invention, there is provided an entanglement of nanometric filamentary structures and bundles thereof, wherein the entanglement has a density of less than 8 mg/cm$^3$.

According to another aspect of the present invention, there is provided an entanglement comprising a plurality of filaments as described in the present invention.

According to another aspect of the present invention, there is provided a filament and elongated member combination comprising at least one filament as defined in the present invention and an elongated member. The at least one filament being rolled up around the elongated member. The combination can also comprise an entanglement of filaments rolled up around the elongated member. The elongated member is preferably an electrode.

According to another aspect of the present invention, there is provided a macroscopic assembly of nanometric filamentary structures. The macroscopic assembly comprises a plurality of entangled nanometric filamentary structures, and bundles thereof connected together and substantially aligned in the same direction, wherein the macroscopic assembly has a density of less than 8 mg/cm$^3$.

According to another aspect of the present invention, there is provided a macroscopic assembly comprising a plurality of microscopic assemblies of nanometric filamentary structures, the macroscopic assembly being obtained by passing a gaseous phase comprising the nanometric filamentary structures through a space defined between at least two electrodes generating an electric field, wherein microscopic assemblies of the nanometric filamentary structures are formed, substantially aligned in accordance with the electric field, assembled together, and deposited on at least one of the electrodes, thereby forming the macroscopic assembly.

According to another aspect of the present invention, there is provided a method for preparing a macroscopic assembly of nanometric filamentary structures comprising passing a gaseous phase comprising the nanometric filamentary structures through a space defined between at least two electrodes generating an electric field, wherein microscopic assemblies of the nanometric filamentary structures are formed, substantially aligned in accordance with the electric field or in the direction of the electric field, assembled together, and deposited on at least one of the electrodes, thereby forming the macroscopic assembly.

According to another aspect of the present invention, there is provided a method for preparing a macroscopic assembly of nanometric filamentary structures as defined in the present invention, the method comprising passing a gaseous phase comprising the nanometric filamentary structures through a space defined between at least two electrodes generating an electric field, wherein microscopic assemblies of the nanometric filamentary structures are formed, substantially aligned in accordance with the electric field, assembled together, and deposited on at least one of the electrodes, thereby forming the macroscopic assembly.

It was found that the latter two methods permit to prepare a macroscopic assembly of nanometric filamentary structures that have very interesting properties such as a low density, a high specific area, and a high porosity. Such methods contrast with growing techniques usually used for nanometric filamentary structures. In the growing techniques for carbon nanotubes, the growth is realized on a substrate or from a seed. In fact, the nanotubes will grow from the catalyst particles or continue the growth of an assembly of existing nanotubes. The growth process will begin when a carbon-containing gas will contact the catalyst particles or the assembly of nanotubes. Carbon will thus be added to the particles or the assembly, in order to form new nanotubes. Then, further carbon will be incorporated in the structure to form longer nanotubes or assembly thereof and so on. However, in the methods of the present invention, the nanometric filamentary structures (preferably single-wall carbon nanotubes) in the gaseous phase are already grown and they are assembled or connected to one another and aligned by the electric field when they are deposited on the electrodes. The latter two methods are thus not a growing process.

The expression "nanometric filamentary structures" as used herein refers to one-dimensional nanometric structures. Such structures preferably have a high dipole moment when they are charged since such nanometric structures have a high aspect ratio (length/diameter), which is preferably above 10. Preferably, they have a diameter that is inferior to about 100 nm, which allows a significant increase in the local electric field at the tip or the surface of the structures, so that they can readily emit electrons by the field or Schottky emission effect.

The expression "microscopic web-like structure" as used herein when referring to nanometric filamentary structures, refers to a web-like structure having a size of 1 cm or less and in which the nanometric filamentary structures and aggregates thereof are entangled and linked together by electrostatic and/or polarization forces such as Van der Waals forces.

The expression "macroscopic web-like structure" as used herein when referring to nanometric filamentary structures, refers to a web-like structure having a size of more than 1 cm and in which the nanometric filamentary structures and aggregates thereof are entangled and linked together by electrostatic and/or polarization forces such as Van der Waals forces.

The term "aggregates" as used herein when referring to nanometric filamentary structures refers to an assembly of a plurality of nanometric filamentary structures and/or bundles thereof that can be entangled with a certain alignment along a preferential direction to form macroscopic filaments. This assembly preferably contains a high proportion of voids and is obtained during an aggregation process induced by an electric field.

In the methods and apparatuses of the present invention, the nanometric filamentary structures can comprise nanowires, nanorods, nanofibers, nanoribbons, nanotubes or bundles thereof, or mixtures thereof. The nanometric filamentary structures are preferably carbon nanometric filamentary structures. More preferably, the nanometric filamentary structures are selected from the group consisting of single-wall carbon nanotubes, multi-wall carbon nanotubes, carbon nanometric fibres and mixtures thereof. Single-wall carbon nanotubes are particularly preferred. Alternatively, the nanometric filamentary structures can be one-dimensional nanostructures (such as nanowires, nanorods, nanofibers, nanoribbons, or nanotubes or bundles thereof) of a member preferably selected from the group consisting of C, BN, B, Si, Ge, Bi, Sn, Te, Se, Hg, $Si_3N_4$, $V_2O_3$, $MX_2$ wherein M is Ti, Zr, Hf, Nb, Ta, Mo, W or Re and X is S, Se or Te, InP, InAs, GaN, GaP, GaAs, $Ga_2O_3$, ZnO, $In_2O_3$, $Na_2V_3O_7$, $Al_2O_3$, $B_2O_3$, MgO, CdO, $SiO_2$, $SnO_2$, CuO, $(SN)_x$, $Cu_2S$, $B_xC_yN_z$, $NiCl_2$, InS, ZnS, ZnSe, CdS, CdSe, $Ag_2Se$, SiC, $B_4C$, $M_2MoX_6$ wherein M is Li or Na and X is Se or Te, coated structures thereof and mixtures thereof.

The gaseous phase or gaseous composition used in the methods and apparatuses of the present invention can comprises a carrier gas and the nanometric filamentary structures. It can have a density of about $1\times10^6$ to about $1\times10^{12}$, preferably about $1\times10^6$ to about $1\times10^{12}$, and more preferably about $5\times10^8$ to about $5\times10^{10}$ nanometric filamentary structures per $cm^3$. The carrier gas can be selected from the group consisting of He, Ar, $H_2$, $H_2O$, $H_2S$, $CO_2$, CO, $N_2$, Kr, Xe, Ne and mixtures thereof. Preferably, the carrier gas is Ar, He or a mixture thereof. The gaseous phase or gaseous composition is preferably injected or passed through the space substantially perpendicularly to the electric field. Another gas can also be injected into the gaseous phase, preferably in a counter-current manner. The another gas can injected through the space (defined between the electrodes) for slowing down the nanometric filamentary structures passing through the space and/or increase local density of the suspended particles. The other gas preferably has a density that is lower than the density of the gaseous phase. The other gas is preferably argon, helium, or a mixture thereof.

In the methods and apparatuses of the present invention in which a deposit of nanometric filamentary structures is made, the deposit can comprise a plurality of filaments. Each of the filaments can comprise a plurality of macroscopic assemblies of nanometric filamentary structures or aggregates thereof as defined in the present invention. These filaments can form together a microscopic web-like structure. The filaments can alternatively form a macroscopic web-like structure.

The nanometric filamentary structures and aggregates of nanometric filamentary structures deposited can have a very low density. As example, for carbon nanometric filamentary structures such as single-wall carbon nanotubes, the lower limit for the density of the macroscopic web-like structure formed (entanglement of filaments of the raw product of 10 cm long) can be as low as about 1.3 mg/$cm^3$ since it almost floats in the air. During the process, the deposit is easily compacted because of the Van der Waals forces between the carbon nanotubes. One gram of the raw deposit manipulated can then occupy a volume of about 125 $cm^3$, which can give an upper limit of about 8 mg/$cm^3$ for the density of the deposit. Their density is then increased when they are manipulated so as to reach the upper limit of about 8 mg/$cm^3$.

In the methods and apparatuses of the present invention when use is made of electrodes, the electrodes can be flat electrodes or electrodes in the form of a rectangular prism. They can also be cylindrical electrodes. Preferably a current density having an intensity of about 0.01 to about 500, and more preferably about 0.1 to about 10 $\mu A/cm^2$ can be applied to the electrodes. The electric field can be a macroscopic electric field having a value of about $1\times10^4$ V/m to about $1\times10^7$ V/m and preferably of about $1\times10^5$ V/m to about $5\times10^6$ V/m. The potential difference applied between the electrodes can be a Direct Current (DC) potential. The potential difference applied between the electrodes can also be an Alternating Current (AC) potential. Alternatively, simultaneous use of DC and AC can be made. Before passing the gaseous phase comprising the nanometric filamentary structures through the space, the gaseous phase can be treated for ionizing the nanometric filamentary structures contained therein before the nanometric filamentary structures get polarized. Ionization can be carried out by an induced current produced by a magnetic field or can be carried out with a set of electrodes between which a current is flowing. It can also be carried out by photoionization. The magnetic field can be produced by a coil, a permanent magnet, an electromagnet, or a solenoid. Ionization can be carried out by using an AC current (preferably having a frequency above 1 KHz) or a DC current. The photoionization can be carried out with a photon source such as a flash lamp, a mercury lamp, an ultraviolet lamp or the like. An additive gas can also be further added to the gaseous phase in order to modify, inhibit or favor ionization of the nanometric filamentary structures. The nanometric filamentary structures can also be doped with a compound comprising B,F,N,K or mixtures thereof, in order to modify, inhibit or favor ionization of the nanometric filamentary structures. The additive gas can be selected from the group consisting of $N_2$, $SF_6$, $O_2$, $H_2O$, HF, $H_2S$, $CH_3SH$, $CH_3CH_2SH$, $CO_2$, CO and mixtures thereof. Preferably, the additive gas is $N_2$, $SF_6$, $O_2$, CO or $H_2O$.

In the methods and apparatuses of the present invention when use is made of electrodes, the electrodes can be in rotation relation to one another in order to prevent the deposit of nanometric filamentary structures from bridging them. A first electrode can comprise an elongated member defining an internal bore dimensioned to receive a second electrode. The first and second electrodes can be substantially parallel to one another. The second electrode can be longitudinally aligned with the first electrode. Preferably, the second electrode is disposed in a substantially coaxial alignment into the internal bore. Alternatively, the second electrode is disposed into the internal bore in a substantially perpendicular manner to the elongated member. Preferably, at least one of the electrodes is adapted to be rotated, whereby the deposit of nanometric filamentary structures is at least partially rolled-up around this electrode. The second electrode can be rotated at a predetermined speed, thereby preventing the deposit from bridging the electrodes. The electrode can be rotated at a speed of about $10^{-2}$ to about 200 rpm, preferably at speed of about 0.1 to about 100 rpm and more preferably at a speed of about 1 to about 30 rpm.

In the methods and apparatuses of the present invention, detection or monitoring of the presence of nanometric filamentary structures within the gaseous phase is preferably made. Such a detection or monitoring step can be made before introducing the gaseous phase into the space between the electrodes or before depositing the structures. The detection or monitoring step can be carried out by analyzing behavior of the current over a predetermined period of time and/or analyzing size, density or shape of the nanometric filamentary structures or aggregates thereof. The detecting or monitoring step can be carried out in a chamber adjacent and in communication with the space. The detecting or monitoring is preferably carried out in real time and more preferably over a period of less than 100 seconds. The analysis of the behavior of the current can be carried out by analyzing the derivative of the current as a function of time. The analysis of the behavior of the current can also be carried out by analyzing the mean intensity of the current as a function of time and its standard deviation or by analyzing the resistance of the current as a function of time. The analysis of the density of the nanometric filamentary structures can be carried out by analyzing the optical absorption of the nanometric filamentary structures present in the gaseous phase. The analysis of the nanometric filamentary structures is preferably carried out by means of an optical probe. The optical probe can be selected from the group consisting of a laser beam, an infrared light beam, a visible light beam or an ultraviolet light beam and mixtures thereof. The analysis of the size, density or shape of the deposited nanometric filamentary structures or aggregates thereof can also be carried out by monitoring the deposition of the nanometric filamentary structures with a camera. The analysis is preferably carried out on real time while passing the gaseous phase through the space by monitoring the change of the current or of a resistance over time. The analysis is preferably carried out in real time over a time frame less than 100 seconds. During the analysis, a comparison of the data obtained can be compared with standard graphs in order to determine the presence or absence of the nanometric filamentary structures. As example, a graph illustrating the current or resistance as a function of time can be used in order to determine and confirm that the desired structures are produced. In particular, the analysis can be compared with a standard graph, calibrated with ex-situ analysis Thermogravimetric Analysis (TGA), Transmission Electron Microscope (TEM), Scanning Electron Microscope (SEM) and Raman spectroscopy, in order to estimate the quality of the deposit. When carrying out a method for depositing nanometric filamentary structures, the detection step or the analysis can be carried out in the main chamber whereat the deposit is made or it can be carried out in a secondary chamber adjacent to the main chamber and in fluid flow communication therewith. The use of such a secondary chamber can be particularly advantageous since it permits to analyze the structures that are recently produced by periodically sensing the structures just as they are produced. In fact, by doing such a sampling in the secondary chamber, it is possible to monitor in real time the quality and/or quantity of the structures produced. The analysis made in the secondary chamber concerns only the structures that have been introduced therein at a selected time. Therefore, by repeating such an analysis in the secondary chamber, at desired intervals of time, it is possible to more accurately determine when the quality or quantity of the structures produced changed during the production. It will thus eventually permit to detect if an insufficient quality of structures is produced and a user will be able to stop the production before the amount of previously deposited structures gets further contaminated by structures of poor quality. The secondary chamber can optionally be cleaned at a desired time such as between the sensing of two batches.

In the apparatuses of the present invention, the electrodes can be in rotation relation to one another. They can also be adapted to generate an electric field for depositing the nanometric filamentary structures on at least one of the electrodes. The housing can be in the form of an elongated member. The elongated member can be the first electrode. The elongated member can further comprise at least one observation window. The second electrode can be longitudinally aligned with the elongated member. Preferably, the second electrode is substantially parallel to the first electrode and more preferably, the second electrode is disposed in a substantially coaxial alignment with the elongated member. The second electrode can alternatively be disposed into the internal bore in a substantially perpendicular alignment to the elongated member. The second electrode can be rotatably mounted on the supporting member. The supporting member can comprise a motor for rotating the second electrode. The means for preventing the deposited nanometric filamentary structures from bridging the electrodes (or for substantially removing any structures that are bridging the at least two electrodes) can comprise at least one electrode adapted to be rotated so as to roll up the structures around it. A motor for rotating at least one of the electrodes with respect to the other electrode can also be comprised. The first and second electrodes can be flat electrodes or electrodes in the form of a rectangular prism. They can also be cylindrical electrodes.

In the apparatuses of the present invention, an ionization unit is preferably further comprised. Such an ionization unit preferably comprises means for generating a current, means for generating a magnetic field or photoionization means and can be in fluid flow communication with the bore and upstream of the first and second electrodes. The unit can be disposed within the bore or adjacent to it. The unit can be effective for ionizing the structures before they are received and polarized within the space. The means for generating the magnetic field preferably comprises a pair of electrodes, a coil, a permanent magnet, an electromagnet, or a solenoid. The outlet of the apparatus preferably comprises a filter. The ionization unit preferably comprises at least one pair of electrodes from which charges are emitted in order to ionize the nanometric filamentary structures present in the gaseous phase. The ionization unit can comprise an AC current (preferably frequency above 1 KHz) or a DC current. The apparatuses can further comprise a monitoring device or secondary chamber which is adapted to be, when desired, in fluid flow communication with the space for detecting the presence of nanometric filamentary structures, to monitor the density of the nanometric filamentary structures in the gaseous phase or the inlet supply rate of the nanometric filamentary structures. The monitoring device can comprises at least two electrodes defining therebetween a space dimensioned to receive the gaseous phase comprising the nanometric filamentary structures, the electrodes being adapted to generate an electric field for depositing the nanometric filamentary structures on at least one of the electrodes. The monitoring device also includes means for analyzing behavior of current between the electrodes over a predetermined period of time and/or analyzing size, density or shape of deposited nanometric filamentary structures or aggregates thereof. The monitoring device can comprise means for analyzing the optical absorption of the nanometric filamentary structures present in the gaseous phase. The means for analyzing the optical absorption can comprise an optical probe, which is preferably selected from the group consisting of a laser beam, an infrared light beam, a visible light beam or an ultraviolet light beam and mixtures thereof. The monitoring device is preferably adapted to detect the presence of nanometric filamentary structures, to monitor the density of the nanometric filamentary structures in the gaseous phase or the inlet supply rate of the nanometric filamentary structures. The apparatuses can further comprise means for collecting the nanometric filamentary structures deposited on at least one of the electrodes. The means for collecting the structures can comprise a scraper adapted to remove the nanometric filamentary structures deposited on at least one of the electrodes. The scraper, when actuated, permits to scrape off the deposited structures from at least one of the electrodes. The scraper can be of various configurations. It can be adapted to slidably mount on one of the electrodes or an adjacent structure thereof and when desired, the scraper can be used to scrape off the structures from the electrode. The apparatuses can further comprise a collecting chamber, adapted to be, when desired, in fluid flow communication with the space, for collecting the nanometric filamentary structures removed from at least one of the electrodes. The collecting chamber is preferably maintained under an inert atmosphere in order to prevent or reduce risks of exposition of the nanometric filamentary structures to oxygen or moisture.

In the macroscopic assemblies and methods of preparation thereof, filament, entanglement, foam and, filament and elongated member combinations of the present invention, the macroscopic assembly of nanometric filamentary structures in preferably the form of a foam. The nanometric filamentary structures used in the gaseous phase are preferably already grown nanometric filamentary structures. At least a portion of the microscopic assemblies can comprise a plurality of substantially parallel and spaced apart members. At least a portion of the microscopic assemblies substantially aligned in a same direction can be substantially parallel and spaced apart. At least a portion the members of the microscopic assemblies can be substantially tangled up or in the form of an entanglement. The microscopic assemblies are preferably assembled together along the electric field lines. The macroscopic assemblies can have a density of less than 8 mg/cm$^3$, preferably less than 7 mg/cm$^3$, more preferably less than 5 mg/cm$^3$, and even more preferably less than 3 mg/cm$^3$. Alternatively, the macroscopic assemblies can have a density of about 0.8 to about 6 mg/cm$^3$, preferably of about 1.0 to about 5.8 mg/cm$^3$ and more preferably of about 1.3 to about 5.5 mg/cm$^3$. The macroscopic assemblies can have a diameter of less than 100 nm, preferably of less than 50 nm, and more preferably of less than 30 nm. Alternatively, the diameter can be about 1 nm to about 100 nm, preferably of about 2 nm to 75 nm, and more preferably about 5 nm to about 50 nm. The macroscopic assemblies can comprise at least $10^4$ nanometric filamentary structures. In the macroscopic assemblies, the nanometric filamentary structures are preferably carbon nanotubes and more preferably single-wall carbon nanotubes. The microscopic assemblies can have a length of at least 10 μm, preferably at least 50 μm, and more preferably at least 100 μm. Alternatively, the length can be about 10 μm to about 100 μm. The microscopic assemblies connected together can substantially form a fractal pattern. The microscopic assemblies are preferably connected together and are substantially aligned along a longitudinal axis. More preferably, the microscopic assemblies are connected together and substantially aligned along a longitudinal axis in such a manner that at least a major portion of the members of two adjacent microscopic assemblies are substantially aligned in the same direction. The macroscopic assembly of nanometric filamentary structures can have a purity of at least 25% by weight, preferably at least 40% by weight, more preferably at least 45% by weight, even more preferably at least 50% by weight, and still even more preferably at least 55 by weight%. They can even have a purity of at least 60% or at least 75% by weight.

Some metal particles and/or a coating substance (such as amorphous carbon, graphitic carbon, fullerenes, or mixtures thereof) can be disposed between the members of the microscopic assemblies. Other members can be disposed substantially perpendicularly to the members of the microscopic assemblies. The macroscopic assemblies are preferably in the form of a filament and/or a foam. The nanometric filamentary structures can be doped single-wall carbon nanotubes. The single-wall carbon nanotubes can comprise a doping element selected from the group consisting of B, F, N, K, Na, Li, Si, and mixtures thereof. The doping element can be in the form of nanoparticles.

The filaments can have a length of at least 1 cm, preferably at least 20 cm, and more preferably at least 100 cm. In the entanglement the filaments are preferably at least partially rolled around an elongated member. The elongated member is preferably an electrode. The methods for preparing assembly of nanometric filamentary structures are preferably carried out by substantially preventing the deposited nanometric filamentary structures from bridging the electrodes during the deposition. The entanglement of filaments preferably forms a macroscopic web-like structure.

The methods and apparatuses described in the present invention are preferably used downstream of gas phase synthesis processes, since they are adapted to treat nanometric filamentary structures in gaseous phase. If an apparatus or method for producing nanometric filamentary structures does not produce such structures by means of a gas phase synthesis, it is possible to recuperate the nanometric filamentary structures and insert them in a gas phase so as to use the methods and apparatuses described in the present invention. Moreover, it is possible to produce the macroscopic assemblies, foam, filaments, entanglements, and mixtures thereof of the present invention with high purity by admixing together high purity nanometric filamentary structures with a carrier gas so as to form a gaseous phase. Then, this gaseous phase is treated by using a method as described in the present invention so as to obtain the desired macroscopic assemblies, foam, filaments, entanglements, and mixtures thereof of the present invention.

The person skilled in the art would understand that all the preferred embodiments previously presented can be useful, when applicable, in any of the apparatuses or methods of the present invention.

According to another aspect of the present invention, there is provided a method for preparing a macroscopic assembly of nanometric filamentary structures as defined in the present invention. The method comprises passing a gaseous phase comprising the nanometric filamentary structures through a space defined between at least two electrodes generating an electric field, for depositing the nanometric filamentary structures on at least one of the electrodes, thereby forming a macroscopic assembly of nanometric filamentary structures.

According to another aspect of the present invention there is provided a foam of nanometric filamentary structures.

BRIEF DESCRIPTION OF THE DRAWINGS

Further features and advantages of the invention will become more readily apparent from the following description of preferred embodiments as illustrated by way of examples in the appended drawings wherein:

FIG. 3 is a schematic sectional elevation view of another system comprising an apparatus for producing carbon nanotubes and an apparatus for depositing nanometric filamentary structures according to another preferred embodiment of the present invention;

FIG. 4 is a schematic sectional elevation view that represents in details the apparatus for depositing nanometric filamentary structures schematically represented in FIGS. 1 to 3;

FIG. 5 is a schematic elevation view of an electrode according to another preferred embodiment of the present invention;

FIG. 6 is a front elevation view of an apparatus for depositing nanometric filamentary structures according to another preferred embodiment of the present invention;

FIG. 7 is a side elevation view of the apparatus shown in FIG. 6;

FIG. 13 is a schematic sectional elevation view that represents in details the apparatus for monitoring the production of nanometric filamentary structures schematically represented in FIG. 12;

FIG. 14 is a schematic sectional elevation view of an apparatus for depositing nanometric filamentary structures according to another preferred embodiment of the present invention, wherein the apparatus can comprise various types of ionization units;

DETAILED DESCRIPTION OF PREFERRED EMBODIMENTS OF THE INVENTION

The following examples represent in a non-limitative manner, preferred embodiments of the present invention.

Figure 1:
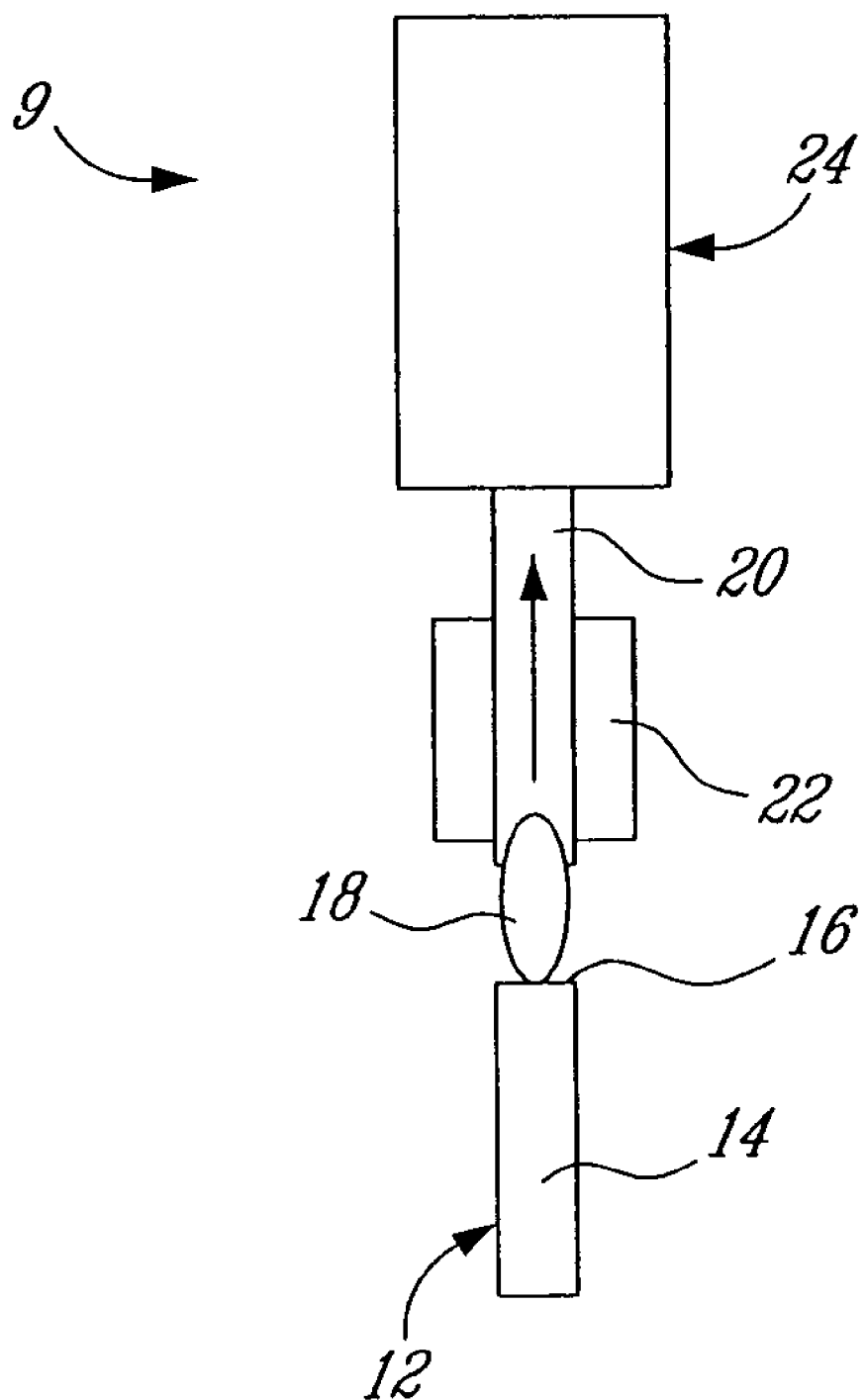
FIG. 1 is a schematic sectional elevation view of a system comprising an apparatus for producing carbon nanotubes and an apparatus for depositing nanometric filamentary structures according to a preferred embodiment of the present invention.

Referring first to FIG. 1, there is shown a system 9 for producing nanometric filamentary structures, which comprises a plasma torch 12 having a plasma tube 14 with a plasma-discharging end 16. The plasma torch can generate, as example, a plasma 18 comprising a portion of ionized atoms of an inert gas, a carbon-containing substance and a metal catalyst, when the desired nanometric filamentary structures are carbon nanotubes. The system also comprises a quartz tube 20 in fluid flow communication with the plasma-discharging end 16. The tube 20 is disposed in an oven 22. An apparatus 24 for depositing nanometric filamentary structures is disposed downstream of the tube 20 and is in fluid flow communication with the latter. The ionized particles contained in the plasma 18 enter the oven 22. When using the system to produce carbon nanotubes, in the oven 22, the atoms or molecules of carbon and atoms of metal catalyst are condensed to form a gaseous phase comprising nanometric filamentary structures such as single-wall carbon nanotubes, multi-wall carbon nanotubes or a mixture thereof. Single-wall nanotubes are particularly preferred. The gaseous phase or gaseous composition is then introduced in the apparatus 24 where the nanometric filamentary structures are deposited and further recovered.

Figure 2:
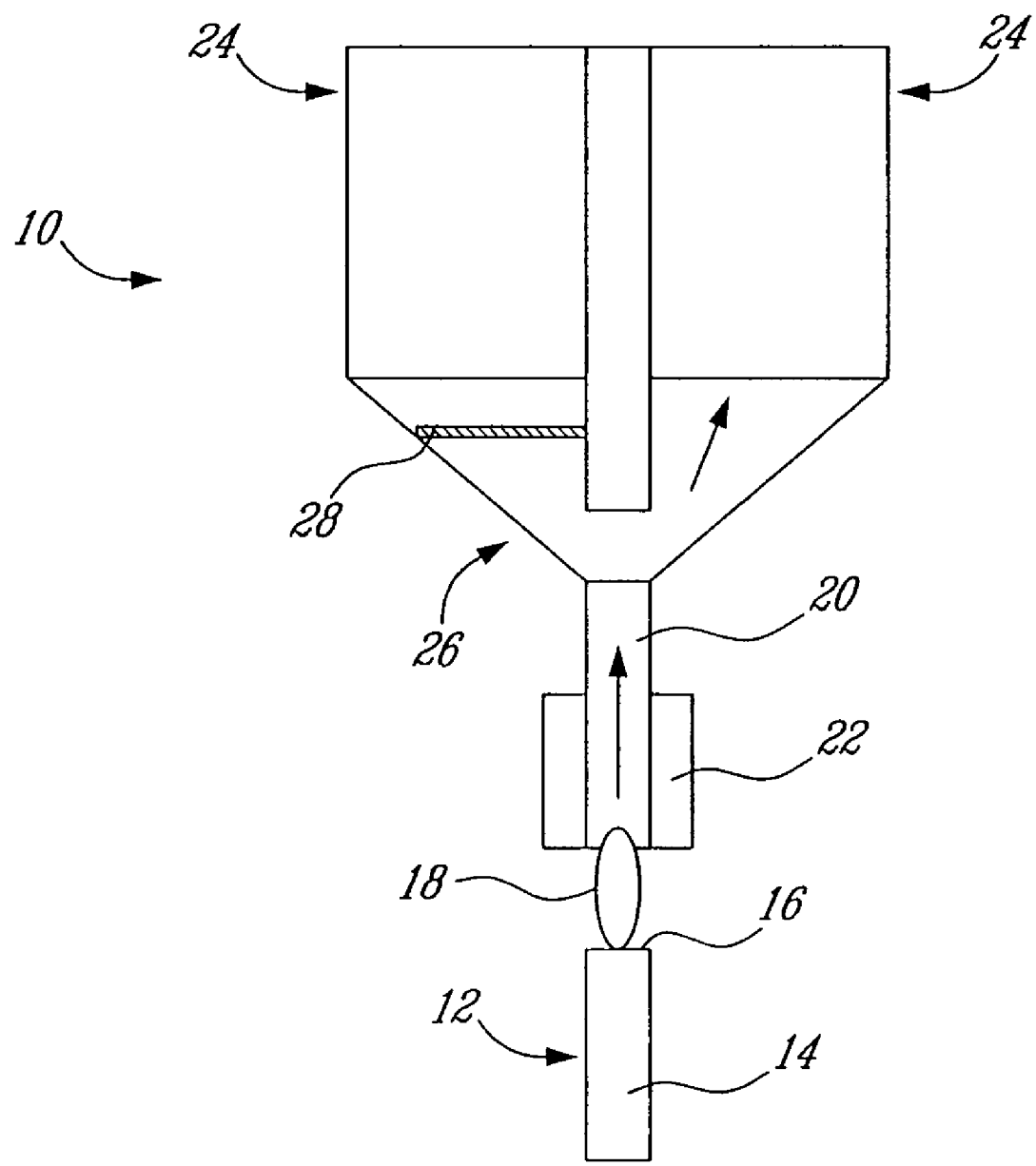
FIG. 2 is a schematic sectional elevation view of another system comprising an apparatus for producing carbon nanotubes and an apparatus for depositing nanometric filamentary structures according to another preferred embodiment of the present invention.

As it can be seen from FIGS. 2 and 3, systems 10 and 11 for producing nanometric filamentary structures are similar to the system 9 with the exception that systems 10 and 11 each comprise two apparatuses 24 (or depositing units) for depositing nanometric filamentary structures. Moreover, systems 10 and 11 each comprise a distributing device or selecting device 26. The difference between system 10 and system 11 reside in their means for selecting a depositing unit or another such as valve 28 and 29, respectively. Both systems 10 and 11 permit to selectively feed any one of their two apparatuses or depositing units 24 by means of their distributing device 26.

The apparatus 24, detailed in FIG. 4, comprises an elongated member or depositing chamber 30 having an inlet 32 and an outlet 34. The elongated member 30 preferably acts as a first electrode and a second electrode 36 is inserted through the elongated member 30. The electrodes 30 and 36 are spaced-apart and a space 38 is defined therebetween. Electrodes 30 and 36 are in substantially parallel relationship and preferably in parallel relationship. More preferably, they are substantially coaxially aligned. A potential difference is applied between electrode 30 and 36 in order to generate an electric field. The electrode 36 is rotatably mounted on a support member 39 that comprises a motor 40. FIG. 5 represents an electrode 37, which is a variant of the electrode 36 shown in FIG. 4.

FIGS. 6 and 7 represent pictures of an apparatus 109, which is similar to the apparatus 24 schematized in FIG. 4. The major difference between apparatus 24 and 109 is that the latter apparatus comprises observation windows 42, 44 and 46 that permit a user to observe the deposit of nanometric filamentary structures on electrode 37.

Figure 12:
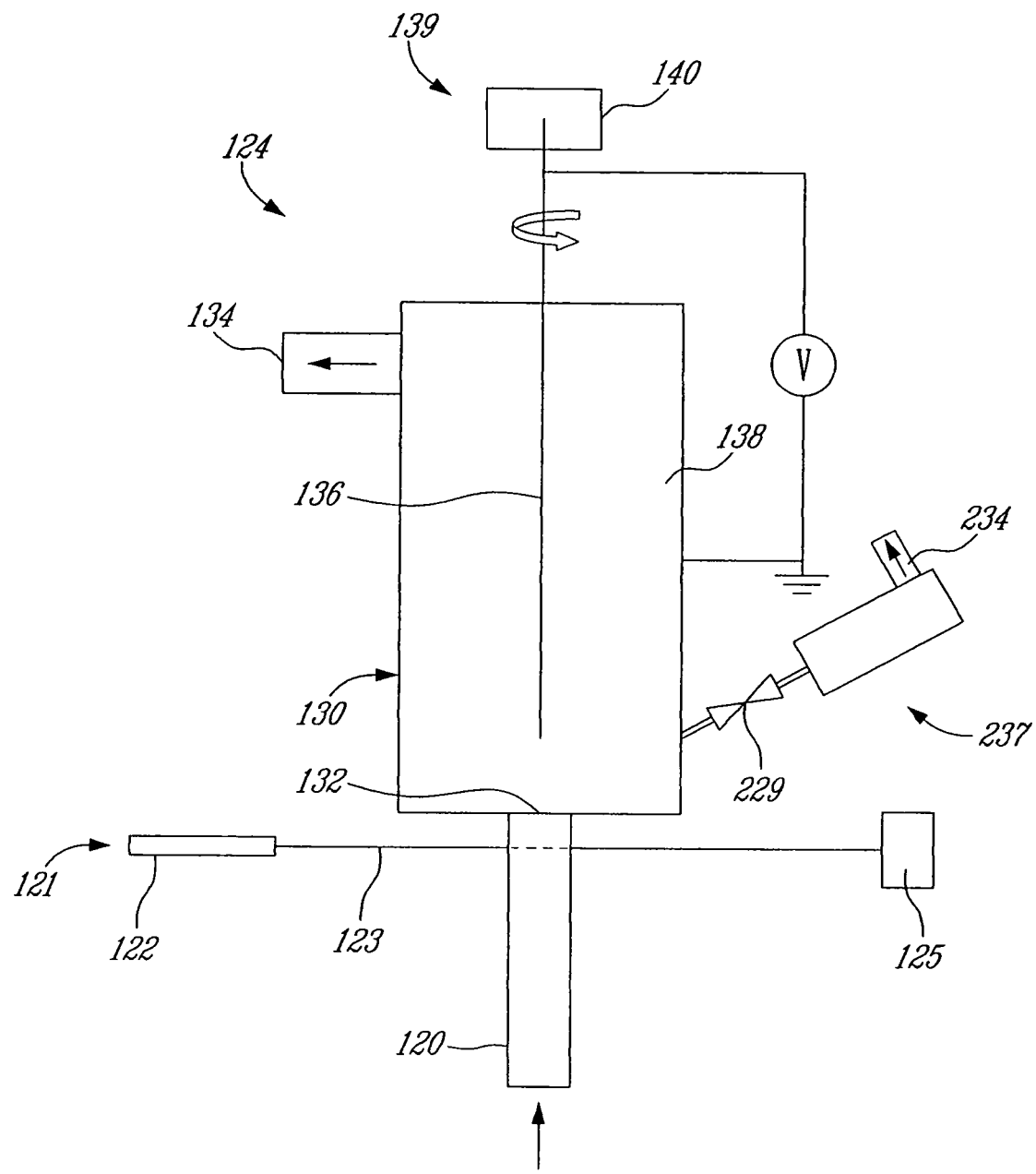
FIG. 12 is a schematic sectional elevation view of an apparatus for depositing nanometric filamentary structures according to another preferred embodiment of the present invention, wherein the depositing apparatus includes an apparatus for monitoring the production of nanometric filamentary structures according to another preferred embodiment of the present invention.

FIG. 12 represents an apparatus 124 for depositing nanometric filamentary structures. The apparatus comprises an elongated member 130 having an inlet 132 and an outlet 134. The inlet 132 is in fluid flow communication with a quartz tube 120 of a plasma torch (not shown) used for producing nanometric filamentary structures such as carbon nanotubes and more particularly single-wall carbon nanotubes. The elongated member 130 acts as a first electrode and a second electrode 136 is inserted through the elongated member 130. The electrodes 130 and 136 are spaced-apart and a space 138 is defined therebetween. The inlet 132 is in fluid flow communication with the space 138 and the outlet 134. Electrodes 130 and 136 are in substantially parallel relationship and preferably in parallel relationship. More preferably, they are substantially coaxially aligned. A potential difference is applied between electrode 130 and 136. The apparatus also comprises an optical probe 121, which includes a laser 122 generating a beam 123, and a photodetector 125. The optical probe 121 is preferably disposed between the tube 120 and the inlet 132 and is adapted to have its beam 123 in visual communication with the structures flowing in the tube 120 and inlet 132. The apparatus 124 is also provided with a monitoring apparatus 237, which can be selectively in fluid flow communication with the space 138 and the inlet 132 by actuating a valve 229. The person skilled in the art would clearly understand that such an apparatus is suitable for depositing carbon nanotubes as well as a plurality of other nanometric filamentary structures as previously defined.

The person skilled in the art would also understand that apparatus 124 is adapted to be mounted on any type of plasma torch as well as downstream of any apparatus for producing nanometric filamentary structures such as HiPco, laser vaporization, gas-phase chemical vapor deposition, electric arc and flame. In fact, it can be mounted on any gas-phase synthesis of nanometric filamentary structures.

As detailed in FIG. 13, the monitoring apparatus 237 comprises an elongated member 230 having an inlet 232 and an outlet 234. The inlet is in fluid flow communication with the valve 229. The elongated member 230 preferably acts as a first electrode and a second electrode 236 is inserted through the elongated member 230. The electrodes 230 and 236 are spaced-apart and a space 238 is defined therebetween. The inlet 232 is in fluid flow communication with the space 238 and the outlet 234. Electrodes 230 and 236 are in substantially parallel relationship and preferably in parallel relationship. More preferably, they are substantially coaxially aligned. A potential difference is applied between electrode 230 and 236 in order to generate an electric field. The electrode 236 is rotatably mounted on a support member 239, which comprises a motor 240. An optical probe or device 221 is disposed adjacently to the inlet 232, which is in fluid flow communication with the valve 229 and the space 138. The device 221 comprises a laser 222 generating a laser beam 223 and a photodetector 225. The device 221 also comprises windows 227 that permit to the beam 223 to pass through the member 230.

As shown in FIG. 14, an apparatus 324 for depositing nanometric filamentary structure comprises an elongated member 330 having an inlet 332 and an outlet 334. The inlet 332 is in fluid flow communication with an outlet 337 of an ionization unit 335 or 335', which has an inlet 333 adapted to receive nanometric filamentary structures from an apparatus for preparing such structures. Such an apparatus can be different nanometric filamentary structures synthesis processes as HiPco, laser vaporization, gas-phase chemical vapor deposition, electric arc and flame. In fact, it can be mounted on any gas-phase synthesis of nanometric filamentary structures. In fact, both type of ionization unit 335 or 335' can be used (see FIGS. 15 and 16). The elongated member 330 acts as a first electrode and a second electrode 336 is inserted through the elongated member 330. The electrodes 330 and 336 are spaced-apart and a space 338 is defined therebetween. The inlet 332 is in fluid flow communication with the space 338 and the outlet 334. Electrodes 330 and 336 are in substantially parallel relationship and preferably in parallel relationship. More preferably, they are substantially coaxially aligned. A potential difference is applied between electrode 330 and 336. The electrode 336 is rotatably mounted on a support member 339, which comprises a motor 340.

Figure 15:
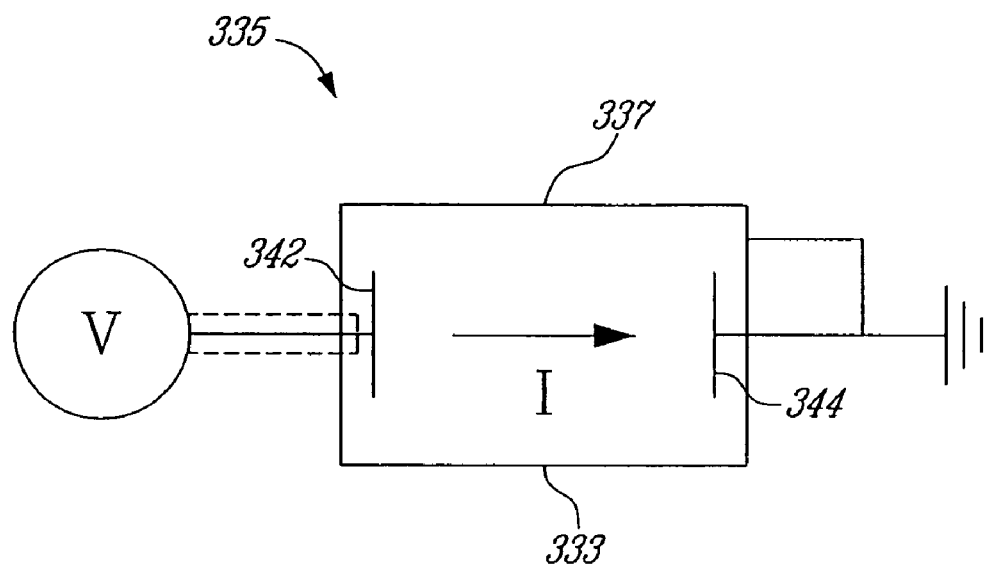
FIG. 15 is a schematic sectional elevation view that represents in details an ionization unit or an apparatus for ionizing nanometric filamentary structures according to another preferred embodiment of the present invention and which is schematically represented in FIG. 14.
Figure 16:
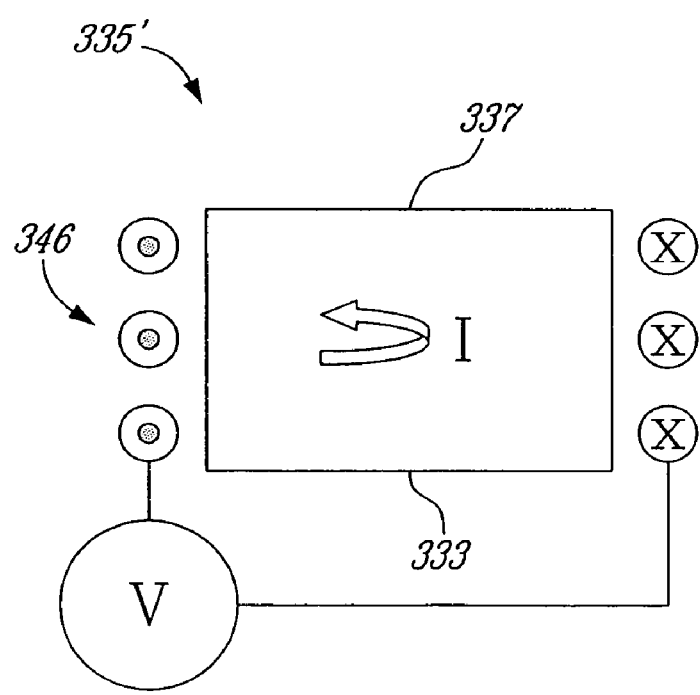
FIG. 16 is a schematic sectional elevation view that represents in details an ionization unit according to another preferred embodiment of the present invention and which is schematically represented in FIG. 14.

As detailed in FIG. 15 the ionization unit 335 comprises the inlet 333, the outlet 337 and a pair of electrodes 342 and 344. As detailed in FIG. 16, the ionization unit 335' comprises the inlet 333, the outlet 337 and a coil 346 which generated a magnetic field variable in time.

Figure 17:
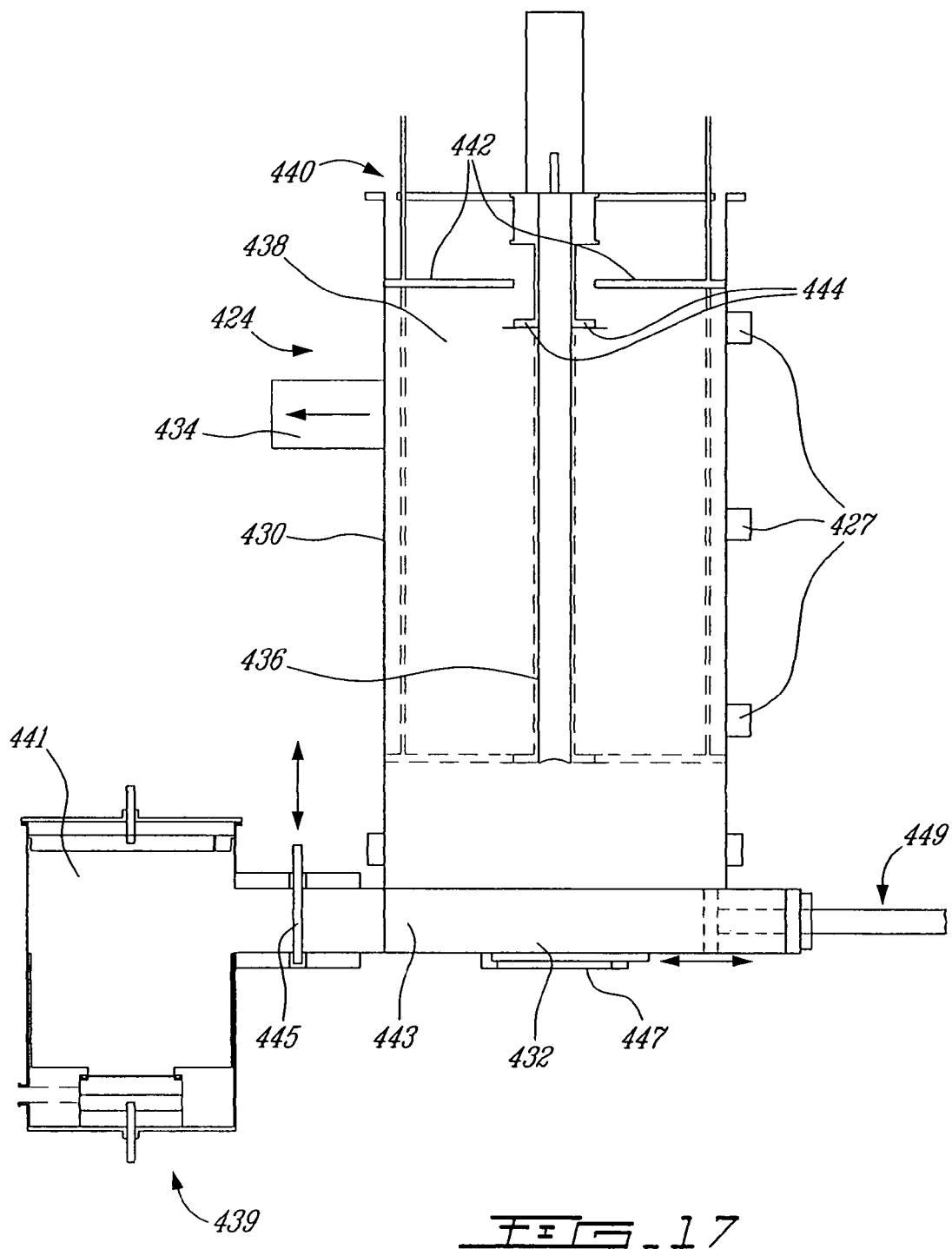
FIG. 17 is a schematic sectional elevation view of an apparatus for depositing nanometric filamentary structures according to another preferred embodiment of the present invention.

FIG. 17 shows an apparatus 424 for depositing nanometric filamentary structure and that comprises an elongated member 430 having an inlet 432 and an outlet 434. The elongated member 430 preferably acts as a first electrode and a second electrode 436 is inserted through the elongated member 430. The electrodes 430 and 436 are spaced-apart and a space 438 is defined therebetween. The inlet 432 is in fluid flow communication with the space 438 and the outlet 434. The inlet 432 is adapted for receiving a gaseous phase comprising the nanometric filamentary structures from an apparatus for producing these structures. The inlet comprises a valve 447 for selectively permitting passage of the structures from the apparatus for producing the structures (not shown) to the apparatus 424. The apparatus 424 also comprises a scraper 440 including members 442 and 444. The members 442 are slidably mounted in the apparatus 424 and are adapted to cause the member 444 to scrape off the structures deposited on the electrode 436. The members 442 when moved downwardly are efficient to scrape off the structures that may be deposited on the electrode 430. The apparatus 424 further comprises a collecting unit 439 including a collecting chamber 441 and a receiving member 443. A valve 445 is provided between the chamber 441 and the member 443 for allowing, when desired, passage of the structures into the chamber 441. The collecting unit 439 also includes means for carrying the structures into the chamber 441 such as a piston 449. Such means can also be a gas stream (preferably an inert gas stream such as argon or helium) or a pressurized system. The apparatus 424 also comprises several observation windows 427.

In the system 9 (FIG. 1), the gaseous phase comprising nanometric filamentary structures is first introduced in the inlet 32 of the apparatus 24 (FIG. 4) before passing through space 38. An electric field is generated in space 38 by the electric potential difference applied between electrodes 30 and 36. The nanometric filamentary structures, when submitted to such an electric field, will tend to aggregate in the gaseous phase, before being auto-assembled into large filamentary structures. At the beginning of the process, the current is almost non-existent since no ionized particles are suspended in the gaseous phase. The nanometric filamentary structures can be easily ionized when submitted to an electric field. Then, these ionized particles will aggregate because the charge held on these high aspect ratio one-dimensional structures will induce a large electric dipole moment (or higher moments). As example, it is possible to calculate the magnitude of the dipole moment $\mu$ for a 5 µm long single-wall carbon nanotube bundle composed of 5-10 nanotubes, holding a total charge q of 4 electrons. In such a case a value $10^5$-$10^6$ times greater than the dipole moment of water ($\mu_{water}=6.0\times10^{-30}$ C m) is found:

$$\mu = qL = 4\times1.6\cdot10^{-19} C \times 5\ \mu m = 5.3\times10^5\ \mu_{water}$$

This high dipole moment is unusual; it is caused by the high aspect ratio (length/diameter) of this nanostructure. Such a dipole permits the aggregation of the different carbon nanotubes since the dipolar interaction energy will overcome the thermal energy for separation distance of the order of few micrometers, explaining why a critical density is needed to observe the aggregation of nanotubes. As the aggregation process takes place in the gaseous phase, the aggregates will become more influenced by the Coulombian interaction since the relative intensity of dipolar interaction ($\propto 1/r^3$) in comparison with Coulombian interaction ($\propto 1/r^2$) decreases as the separation distance between aggregates increases. The resulting particles will diffuse and be attracted toward the electrode or other aggregates of the opposed polarity. The process will last until the aggregates of carbon nanotubes are assembled into large macroscopic filaments (greater than 1 cm) that will try to bridge the electrodes. Similar phenomena are observed when particles with permanent or induced electric dipole are suspended in a gaseous phase as described in Abrahamson, et al. in *Journal of Electrostatics* 55, (2002), 43-63; Tang et al. in *Science* 297, (2002), 237-240; and Schleicher et al. in *Journal* of *Colloid and Interface Science* 180, (1996), 15-21. All these references are hereby incorporated by reference.

Since nanometric filamentary structures have nanometric dimensions (i.e. diameter smaller than about 100 nm) which allow a significant increase in the local electric field at the tip or the surface of the structure, they can thus readily emit electrons by the field or Schottky emission effect. This effect occurs even if the nanometric filamentary structures are insulators, semi-conductors or conductors.

Figure 8:
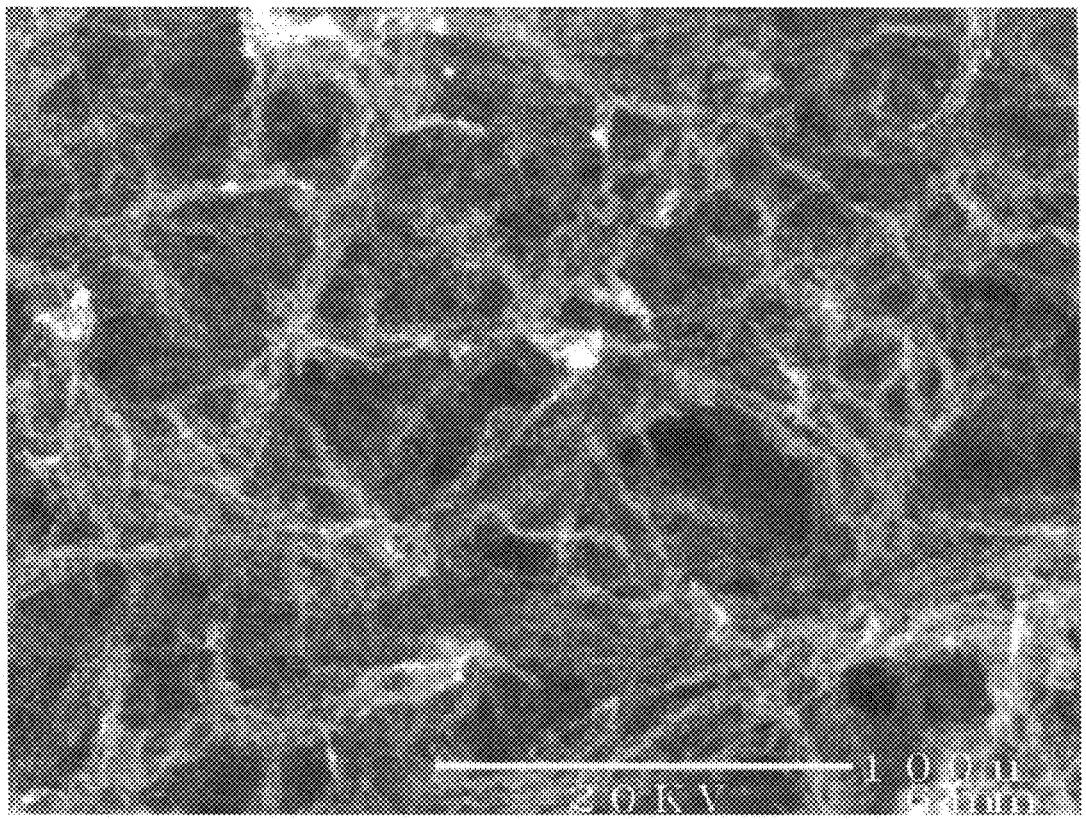
FIG. 8 is a picture of a microscopic web-like structure of single-wall carbon nanotubes obtained using a method and an apparatus for depositing nanometric filamentary structures according to preferred embodiments of the present invention.
Figure 19:
FIG. 19 is a picture showing deposited macroscopic assemblies of nanometric filamentary structures forming a macroscopic web-like structure according to a preferred embodiment of the present invention, in an apparatus for depositing nanometric filamentary structures according to another preferred embodiment of the present invention, wherein means for preventing the structures from bridging the electrodes have been voluntarily inactivated in order to show structures bridging the two electrodes of the apparatus, and wherein the deposited structures are single-wall carbon nanotubes.

In the apparatus 24, when the nanometric filamentary particles are gradually deposited on electrode 36, the electric field and electron flow increase in view of the field or Schottky emission effect. The same also applies to apparatuses 24, 124, 237, 324, and 424. The local electric field becomes large enough for a breakdown at the tip of these particles, and an avalanche thus occurs and propagates to form macroscopic assemblies of nanometric filamentary structures, that eventually form filaments of such macroscopic assemblies. The plurality of filaments then forms an entanglement of filaments, which has a web-like structure or configuration as shown in FIG. 19. It is thus that a macroscopic web-like structure is obtained. Such an entanglement or web-like structure comprises nanometric filamentary structures and their aggregates which are entangled and linked together by electrostatic and polarization forces. Subsequent heating may also form stronger chemical bonds. The web of single-wall carbon nanotubes can be seen as the result of the electrical discharge between electrodes; it will have thus the same structure as the electrical streamers of the discharge. Actually, single-wall carbon nanotube aggregates align themselves with the electric field lines similarly to iron filings in magnetic field lines. This permits to generate the macroscopic assemblies of the present invention. A plurality of such assemblies forms a network such as a web (see FIG. 8 microscopic web-like structure and FIG. 19 macroscopic web-like structure) configuration, which indicates the presence of carbon nanotubes since amorphous carbon does not sufficiently enhance the local electric field (small aspect ratio) to form a web configuration. In the sole presence of amorphous carbon, only small flakes are formed. The particles contained in the gaseous flow, which are not deposited, will exit from the apparatus 24 by means of the outlet 34. Such an outlet also comprises a filter (not shown) which prevents the emission of dangerous particles.

Since the deposited filaments of nanometric filamentary structures have tendency to bridge electrodes 30 and 36 and eventually, over a certain period of time, clog the passage therebetween (space 38), the electrode 36 is preferably rotated for permitting a continuous operation. The rotation of electrode 36 will cause the filaments forming the entanglement or web-like structure to be rolled up around electrode 36, thus preventing the deposit from bridging the electrodes and eventually clog the space 38. Therefore, the deposit does not look like a web anymore. Such a rolled up configuration is similar to the configuration of cotton candy and is clearly shown in FIGS. 9 and 10. The electrode 37, shown in FIG. 5 and having a preferred configuration permits to optimize the rolling up of the deposit around the electrode. The entanglements obtained by using such a method are as long as the inner electrode 36 or 37 is. Moreover, the filaments of the macroscopic assemblies of single-wall carbon nanotubes obtained are highly aligned and they have a very low density. It thus constitutes an interesting characteristic. Such properties are particularly interesting when using these assemblies in order to prepare conductive materials. The deposit can also be carried out with a non-rotating electrode 36 or 37, but the space 38 will be more easily clogged over long periods of time.

A synthesis of nanometric filamentary structures can be carried out in a continuous manner by using system 10 or 11 shown in FIGS. 2 and 3, respectively. When the gaseous phase exits the tube 20 and is introduced in the distributing device 26, it can be selectively directed in any one of the apparatus 24 by mean of the valve 28 or 29. As example, when the gaseous phase is fed into one of the apparatus 24 for depositing nanometric filamentary structures therein, the electrical potential difference in the other apparatus 24 is turned off and the nanometric filamentary structures deposited on its electrode 36 or 37 can be recovered. In such a case, the motor 40 and electrode 36 can be removed from the apparatus 24. When this step is completed, this apparatus 24 can be used again for depositing nanometric filamentary structures. The deposit is thus performed in each apparatus 24 alternatively.

The apparatus 124 shown in FIG. 12 is similar to the apparatus 24 shown in FIG. 4, with the exception that it comprises an optical probe 121 and a monitoring apparatus 237. The nanometric filamentary structures are thus deposited into the apparatus 237 (in the elongated member or depositing chamber 130) in an analogous manner as previously defined for the apparatus 24. With respect to the probe 121 and the monitoring device 237, the apparatus 124 works as follows. The nanometric filamentary structures produced are flowing through the tube 120 and the inlet 132 before entering into the apparatus 124 and more particularly into the space 138 before they deposit on the electrodes and preferably particularly on electrode 136. Before the structures enter into the space 138 and are exposed to the electric field, a laser beam 123 optionally permits to sense the structures in order to analyze them. A lot of information can thus be acquired from such a sensing step such as the density and the production rate of the structures. The monitoring apparatus 237 (see FIGS. 12 and 13) can be, when desired, in fluid flow communication with the space 138 in order to regularly sense or probe the gaseous phase entering from the inlet 132. The valve 229 is thus opened for a selected period of time in order to obtain a sample of the freshly produced gaseous phase containing the desired structures. Once the valve 229 is closed, an electric field is applied on the central electrode 236 for producing a current-time characteristic that depends on the density of the nanometric filamentary structures such as the suspended carbon nanotubes in the monitoring chamber. From the behavior of this characteristic, it is possible to monitor the density and the quality of the carbon nanotubes contained in the gaseous phase by comparing it with a standard graph calibrated with ex situ measurement (TGA (Thermogravimetric Analysis), SEM (Scanning Electron Microscope), TEM (Transmission Electron Microscope). It is also possible to obtain some more information about the gaseous phase by sensing it with the optical probe 221 that may be polarized or not. The additional information obtained can be the density, the production rate, the nature and the degree of alignment of the suspended structures. It is thus possible to produce with the monitoring apparatus graphs as those shown in FIGS. 23 to 26. Once this analysis is done, the electric field can be turned off; the central electrode 236 may be rotated to roll-up the filaments of nanotubes bridging the electrodes before new sampling of the gas flow can then be made by reopening the valve. It is possible to clean up the monitoring apparatus 237 between each probing of the gaseous phase. Optionally, a plurality of monitoring apparatuses can also be used.

At the beginning of the monitoring process, the current between the electrodes of the monitoring or depositing apparatus is negligible since there is no significant amount of ionized particles in suspension. As the gaseous phase or gaseous composition, containing the carbon nanotubes enters the inlet of the apparatus similar to FIG. 12, the current increases since these carbon particles can emit electrons and be charged more easily. The current is thus dramatically enhanced, as the density of carbon nanotubes increases in the apparatus. For example, it can vary from 10 µA to more than 1 mA when the gaseous phase containing the carbon nanotubes is introduced. Other carbon particles will also increase the current but never at the level that the nanotubes do.

It is important to notice that the great current increase occurs when a critical density of nanotubes is reached. At this threshold density, an aggregation process of the carbon nanotubes into large filaments, trying to bridge the electrodes, takes place. The current really increases when these large filaments of nanotubes are suspended in the gaseous phase. When these structures are prevented from bridging the electrodes 130 and 136, for example by rolling them up on the central electrode, the current level still remains high. Obviously, if the filaments are free to bridge the electrodes, the current will increase substantially, even ten to twenty times more.

These interesting effects can be used to detect the presence of carbon nanotubes but also to compare their production rate in synthesis experiments. Indeed, different production rates of carbon nanotubes will lead to different densities of suspended particles, which will affect the resulting current flowing between the electrodes. Experimentally the current behavior has been also used to optimize the synthesis conditions of the plasma torch process.

The analysis of the current flowing in the monitoring apparatus 237 over time can be realized with quantitative parameters. The mean current, its standard deviation, the resistance between the electrodes and the derivative of the current rise during the nanotube aggregation can be useful in monitoring the production of carbon nanotubes. A high mean current is associated with a high density of carbon nanotubes in the gaseous phase of the monitoring apparatus. The ratio of the standard deviation of the current on its mean value is related to the rolling up of the filaments of carbon nanotubes formed between the electrodes. Actually, it is easier to roll-up the filaments formed in the gaseous phase when their concentration is high, since they are longer. At low concentrations, the small filaments of nanotubes tend to remain suspended in the gaseous phase and on both electrodes instead of being rolled-up. This situation will generally result in more current spikes during the rotation of the electrode 136, i.e. a higher ratio of the standard deviation of the current on its mean value.

From the current behavior, it is also possible to calculate the resistance between the electrodes of the monitoring chamber. A production without nanotubes can give a resistance higher than 50MΩ for present monitoring apparatus 237, while a good production of nanotubes can provide a resistance below 50 MΩ, when using the apparatus 237. The resistance can even reach very low value of few kΩ if the filaments are not prevented from bridging the electrodes and depending of the size of the monitoring apparatus. The sharp rise in current at the onset of the aggregation process can be measured by differentiating the current with respect to the time. For the same rate of production of particles in the monitoring device, the current rise, i.e. the derivative, will be greater for a better purity production since it results in a larger density of carbon nanotubes in the gaseous phase.

The response time of the monitoring apparatus is determined by its volume and the nanotube production rate since a critical density is required before observing their characteristic "signature" in the current behavior. It is thus a considerable advantage to have at least one monitoring apparatus in fluid flow communication with the deposition chamber as shown in FIG. 12 in order to probe or sense regularly the production of carbon nanotubes. Moreover, such a monitoring apparatus permits to avoid artefacts in the current analysis.

The analysis of the current is interesting when monitoring the production of nanometric filamentary structures. An optical probe can also be used simultaneously to complement it since optical absorption permits to monitor the production rate or to evaluate the density of suspended nanometric filamentary structures just before the aggregation process takes place. One or more optical probes can be used. As shown in FIG. 12 one optical device can be disposed adjacently to the inlet of the depositing apparatus 124 in a region where no electric field is applied. Another optical device can be disposed adjacently to the inlet of the monitoring apparatus, as shown in FIG. 13. Optical absorption increases as the density of particles increases in the monitoring apparatus and abruptly decreases when the critical density is reached. It is thus possible to use this maximum of absorption to evaluate the density of nanometric filamentary structures such as carbon nanotubes required to obtain aggregation of these structures. Such a measurement is consistent with the carbon-containing substance injected in the process for preparing the desired structures and the dipolar interaction energy between the suspended structures. A laser beam located in a region where is applied the electric field of the monitoring chamber, as shown in FIG. 13, can be used to make these absorption measurements. The typical transmitted power obtained with a He—Ne laser and a photodetector is presented in the FIG. 26. Other types of laser such as Argon (488 and 514 nm), YAG (532 and 1064 nm), Ruby (694 nm), Dye laser and laser diodes can also be used. In fact, any laser in the ultraviolet, visible and infrared spectral range. The laser beam can also be polarized before probing the suspended structures. From these data, it is possible to roughly estimate the density of the suspended structures such as carbon nanotubes by using, for example, a Beer-Lambert relation for the transmitted power I:

$$I = I_0 e^{-\frac{n_{swnt} \cdot N_{swnt} \cdot \sigma R}{N_A}}$$

$$\Rightarrow n_{swnt} = \frac{N_A}{N_{swnt} \sigma R} \ln(I_0 / I)$$

The parameters contained in the Beer-Lambert relation are $I_0$ the initial transmitted power, $n_{swnt}$ the density of suspended carbon nanotubes, $N_{swnt}$ the number of carbon atoms per nanotube (about $10^6$ atoms per µm of nanotube), $N_A$ the Avogadro number ($6 \cdot 10^{23}$ atoms/mole), σ the optical absorption cross section and R the optical path which is in the cm range. The optical absorption cross section value is determined as indicated by Islam et al. in Physical Review Letters, 93, 2004, 037404, which is hereby incorporated by reference, depending of the light energy and of the orientation distribution of the suspended nanotubes. The results presented in FIG. 26 correspond to a nanotube density in the range of $10^9$ nanotubes/cm$^3$. The optical absorption diagnostic can require calibrations to give accurate absolute density. However, the technique is very sensitive and can be very useful for relative comparison between different samples in the production of nanometric filamentary structures. It was observed that the transmitted power diminishes slowly after the aggregation process. This can be caused by the fact that the observation window(s) are sometimes covered with a carbon coating and such a situation can be avoided by using a gas flow towards the observation windows, permitting the passage to the beam, for preventing the carbon particles to cover them. These methods and apparatuses for monitoring can be applied to a plurality of synthesis methods and apparatuses of nanometric filamentary structures such as plasma torches (RF, or induction, transferred arcs, DC torches, microwaves torches etc.), HiPco, laser vaporization, gas-phase chemical vapor deposition, electric arc and flame. In fact, it can be mounted on any gas-phase synthesis of nanometric filamentary structures.

The apparatus 324 shown in FIG. 14 is similar to the apparatus 24 shown in FIG. 4, with the exception that it comprises an ionization unit 335 or 335'. The nanometric filamentary structures are thus deposited into the apparatus 324 in an analogous manner as previously defined for the apparatus 24. With respect to the ionization unit 335 or 335' (see FIGS. 15 and 16), the apparatus 324 works as follows. It should first be noted that the ionization unit is used to increase the efficiency of the depositing apparatus for the same electrode length and voltage applied. When the gaseous phase is introduced in the ionization unit 335 or 335', the structures contained therein are submitted to a current flowing between the electrodes 342 and 344 (in unit 335) or a current induced by a magnetic field that can be generated by the coil 346 (in unit 335'). By decoupling the ionization and the depositing steps, it is more convenient to uniformly charge and therefore polarize the suspended structures in the gaseous phase before they enter in the space 338. The ionization is realized when a current flows through the particles carried in the gaseous phase. Since the particles are then mostly charged, there will be a faster assembling of the nanotubes under the web-like structure as the gas flows in the space 338 to the gas outlet. By adding the ionization unit 335 or 335', the nanometric filamentary structures can also be deposited at a lower electrical power in the depositing apparatus since some power to ionize the suspended particles is already used. It thus also helps to prevent damaging the structures during the deposition step.

The apparatus 424 shown in FIG. 17 is similar to the apparatus 24 shown in FIG. 4, with the exception that it comprises a collecting chamber 441, a receiving element 443 and a piston 449. The nanometric filamentary structures are thus deposited on the electrodes (preferably the electrode 436) in a similar manner as described for apparatus 24. When the production of structures is stopped the nanometric filamentary structures deposited on the electrode 436 are scrapped off by means of the scrapper 440. The members 442 are moved downwardly in order to contact the member 444 and cause the member 444 to scrape off the structures deposited on the electrode 436. Such a sliding movement also causes the members 442 to scrape off the structures deposited on the electrode 430. The structures removed from the electrodes 430 and 436 are recovered by the receiving member 443 and they are then conveyed into the collecting chamber 441 by means of the piston 449. The structures can also be packaged into the chamber 441. Preferably, the collecting unit 439 is kept under an inert atmosphere in order to reduce the risks of exposing the structures to oxygen or moisture.

Figure 27:
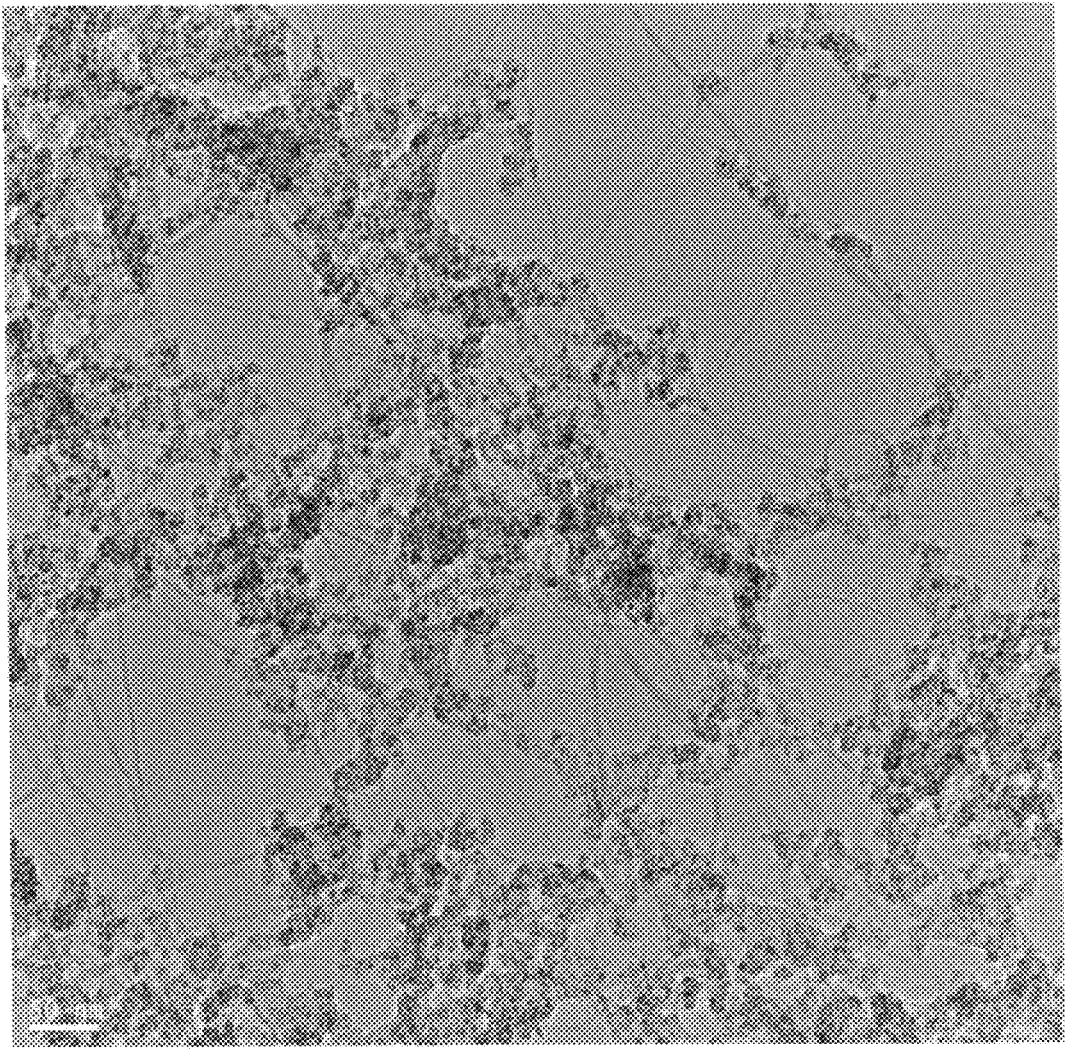
FIG. 27 is a picture showing a microscopic assembly of nanometric filamentary structures according to a preferred embodiment of the present invention, wherein the nanometric filamentary structures are single-wall carbon nanotubes.
Figure 28:
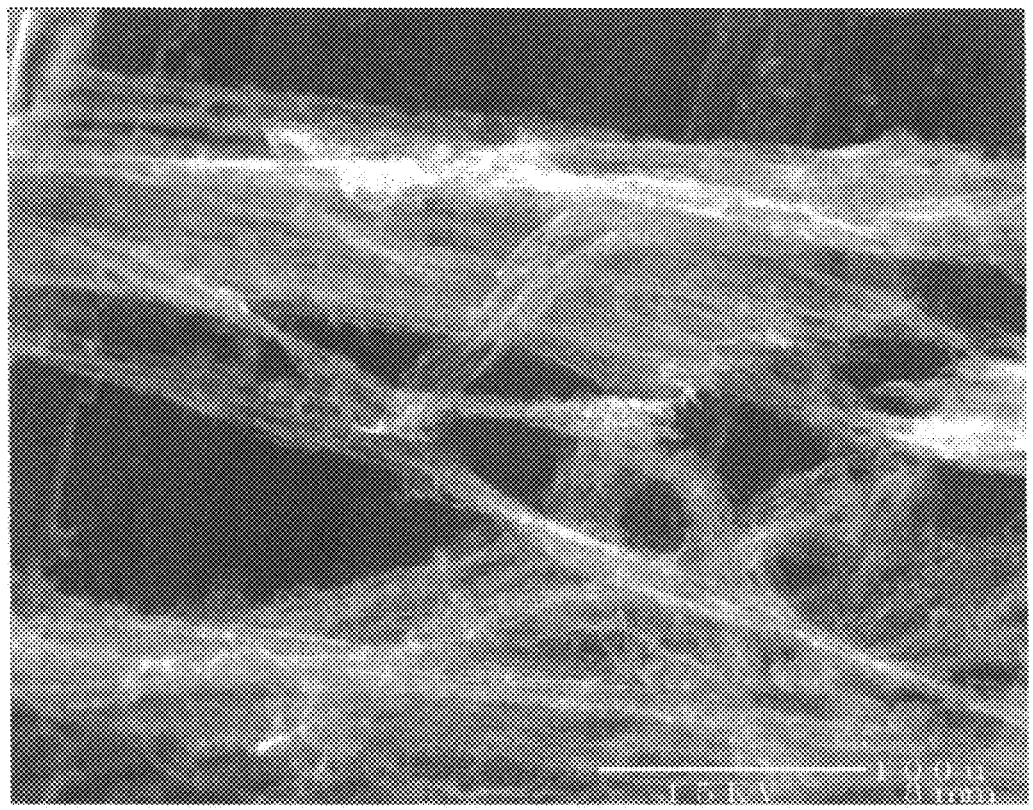
FIG. 28 is a picture showing a macroscopic assembly of nanometric filamentary structures according to a preferred embodiment of the present invention, wherein the macroscopic assembly comprises a plurality of microscopic assemblies as shown in FIG. 27.

The macroscopic assemblies of nanometric filamentary structures according to the present invention (see FIG. 28) can form filaments and more particularly entanglement of filaments. The macroscopic assembly of nanometric filamentary structures is composed of a plurality of microscopic assemblies as shown in FIG. 27. The macroscopic assemblies can be in the form of foam. The structure can be referred to as a structure similar to an aerogel-like structure formed during an aerosol-aerogel transition (see Lushnikov et al. in *Chemical Physics Letters* 175, (1991), 138-142; and Schleicher et al. in *Journal of Colloid and Interface Science* 180, (1996), 15-21). The structure is an assembly of individual and/or ropes of nanotubes entangled together in a macroscopic network having a certain degree of alignment. It comprises an important fraction of voids or interstices that results in a very low density material. For example, the filaments formed between the electrodes can have a fractal structure similar to lightning and can have a so low a density that they can float in the gas flow or in air, indicating a density slightly below 1.3 mg/cm$^3$. As the filaments are assembled and rolled up on the central electrode, they are compacted to a density below 5 mg/cm$^3$ because of the crosslinking with non-covalent bonds such as Van der Waals forces or hydrogen bonding or a combination thereof. Subsequent manipulations may also compact the structure but they generally remain at a density of about 8 mg/cm$^3$ or less. It should be noted that these densities are for non-purified samples containing about 15-20% weight of iron catalyst nanoparticles. Such an assembly having a foam or aerogel-like structure has a low mechanical resistance and can be easily deformed and compacted. However, treatments can be achieved to modify the weak crosslinking bonds and therefore strengthen the structure. These treatments can be annealing, ohmic heating, ultraviolet irradiation. Macroscopic assemblies of nanometric filamentary structures such as carbon nanotubes can also be end or side-wall functionalized to form covalent and ionic crosslinking.

EXAMPLES

The following examples represent only preferred embodiments of the present invention.

Example 1

Deposition of Nanometric Filamentary Structures

An experiment was carried out by using an apparatus for depositing nanometric filamentary structures according to a preferred embodiment of the invention. For this experiment an apparatus similar to the apparatus schematically represented in FIG. 4 was used. The apparatus for depositing filamentary structures was used downstream of a plasma torch for producing single-wall carbon nanotubes for depositing such structures. The plasma torch used was similar to the plasma torch represented in FIG. 1 of US 2003/0211030, which is hereby incorporated herein by reference in its entirety. All the parameters related to the plasma torch are controlled by a computer using the LABVIEW® software. The parameters can also be manually controlled. The inert gas used for generating the primary plasma was argon, the metal catalyst was ferrocene, the carbon-containing gas was ethylene and the cooling gas was helium. Helium was also injected toward the plasma discharging end for preventing carbon deposit. Ferrocene was heated to about 80 to 100° C. prior to be injected. The argon flow varied was about 3200 sccm (standard cubic centimeters per minute). The helium flows were both stabilized at about 3250 sccm, and the ethylene flow varied between 50 and 100 sccm. The temperature of the oven was kept at about 900-1000° C. and measured with a pyrometer. The power of the source generating the electromagnetic radiations (microwaves) was 1500 W and the reflected power was about 200 W. The heat-resistant tubular members were made of quartz. The plasma tube was made of brass. The feed conduit was made of stainless steel. The metal catalyst (ferrocene) and the carbon-containing substance (ethylene) were used in an atomic ratio metal atoms/carbon atoms of 0.02-0.06. The experiment was carried out at atmospheric pressure under inert conditions (helium and argon).

The inner electrode was rotated at a speed ranging from 3 to 200 rpm. The polarity of the inner electrode was between −1000 and −2000 V. The electric field around the central electrode was about $2.5 \times 10^5$ V/m. The flow of helium injected counter-current was about 1500 sccm. By using such a depositing apparatus having a rotating electrode, formation of filaments comprising macroscopic assemblies of single-wall carbon nanotubes was observed and the rotation of the electrode prevented the filaments of single-wall carbon nanotubes from bridging the two electrodes. Thus, the current remained at a relatively low value of about 1 to about 10 mA. The filaments were in fact rolled up around the electrode and the deposit was similar to the deposit shown in FIGS. 9 and 10. An amount of about 500 mg of single-wall was obtained in one hour and the purity was about 40 to 50% by weight. The density of the macroscopic assemblies obtained was about 5 mg/cm$^3$. The deposit was in the form of a foam. The macroscopic assemblies of single-wall carbon nanotubes obtained by such a plasma torch technique can have a purity (or content of single-wall carbon nanotubes by weight) of at least 25% by weight, preferably at least 40% by weight, more preferably at least 45% by weight, even more preferably at least 50% by weight, and still even more preferably at least 55 by weight %. They can even have a purity of at least 60% or at least 75% by weight. It was found that when using a purifying method and/or apparatus as defined in U.S. 60/664,952 filed on Mar. 25, 2005 and in an international application (PCT/CA) entitled Methods and Apparatuses for Purifying Carbon Filamentary Structures filed on Mar. 23, 2006, in combination with the methods and apparatuses of the present invention, the macroscopic assemblies of single-wall carbon nanotubes can have a purity of at least 60%. I Example 2

Deposition of Nanometric Filamentary Structures

This example was carried out using an apparatus for depositing nanometric filamentary structures similar to the apparatus shown in FIG. 12. More particularly, the apparatus for depositing the nanometric filamentary structures was disposed downstream of a plasma torch for producing single-wall carbon nanotubes (as shown in FIG. 1). The plasma torch used was similar to the plasma torch described in FIG. 2 of US 2003/0211030. The plasma torch was operated in a similar manner as described for Example 1.

Figure 11:
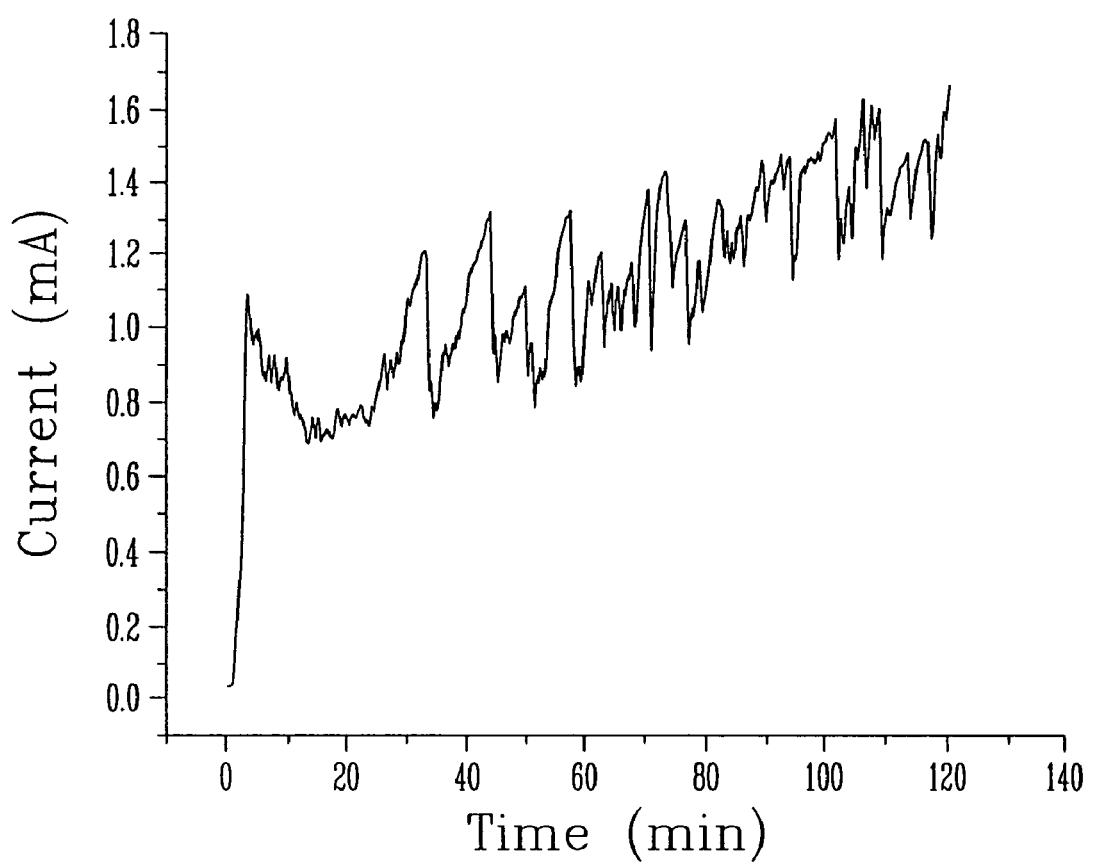
FIG. 11 is a graph showing change of current over time obtained when carrying out a method for depositing nanometric filamentary structures according to another preferred embodiment of the present invention, wherein single-wall carbon nanotubes are deposited.

As the production of single-wall carbon nanotubes begins in the plasma torch process, the gaseous phase containing the particles synthesized or the nanometric filamentary structures are supplied to the inlet of the deposition apparatus. This gaseous phase is similar to a smoke and is accumulating in the deposition chamber, where a voltage is applied on the central electrode in order to generate a electric field. In the present example, a negative voltage difference of 3000V was applied between the inner electrode of a diameter of 0.3 cm and the outer electrode of a diameter of 25 cm, which is corresponding to a macroscopic electric field of about $2.3 \times 10^5$ V/m. The current flowing between the electrodes of the depositing apparatus over the time is shown in FIG. 11.

Figure 9:
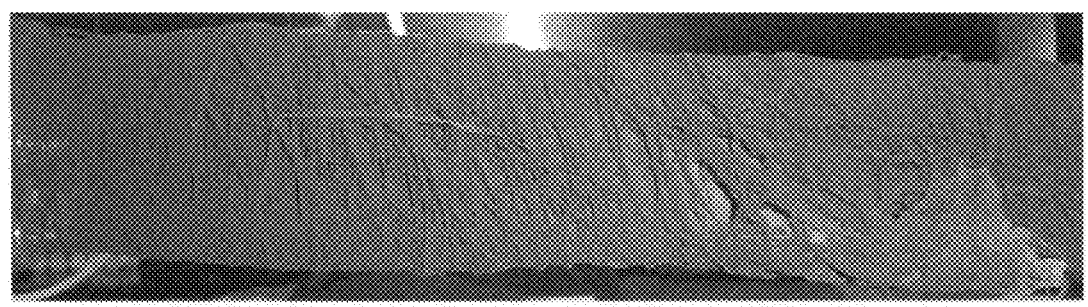
FIG. 9 is a picture of showing filaments of macroscopic assemblies of nanometric filamentary structures according to another preferred embodiment of the present invention, wherein the filaments are rolled up around an elongated member and wherein the nanometric filamentary structures are single-wall carbon nanotubes obtained using a method and an apparatus for depositing nanometric filamentary structures according to preferred embodiments of the present invention.
Figure 10:
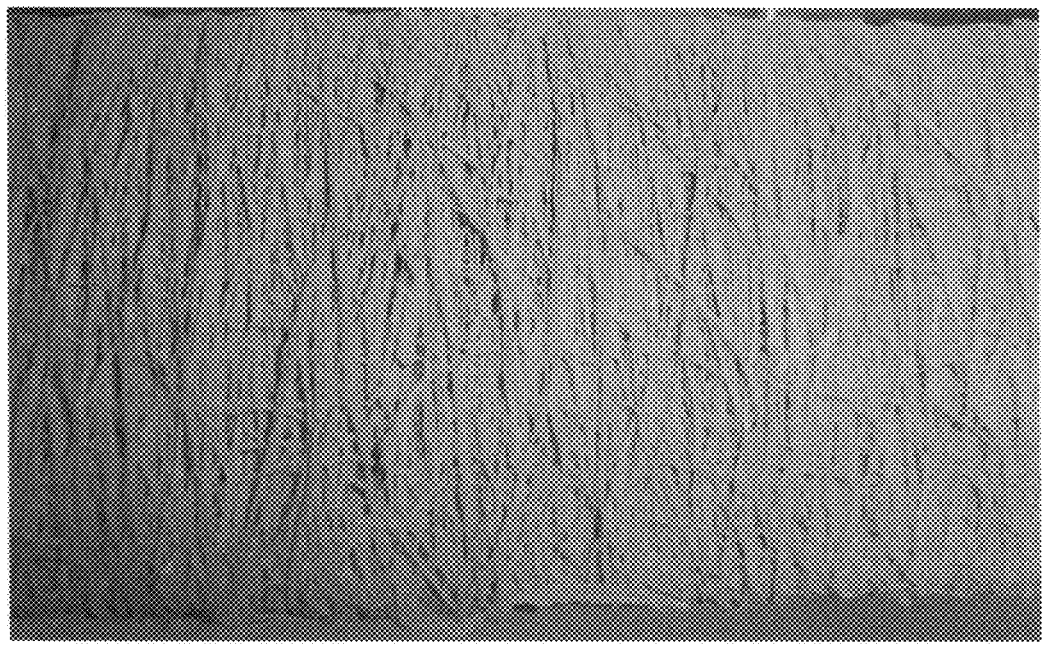
FIG. 10 is closer view of the filaments of macroscopic assemblies of nanometric filamentary structures (single-wall carbon nanotubes) shown in FIG. 9.
Figure 18:
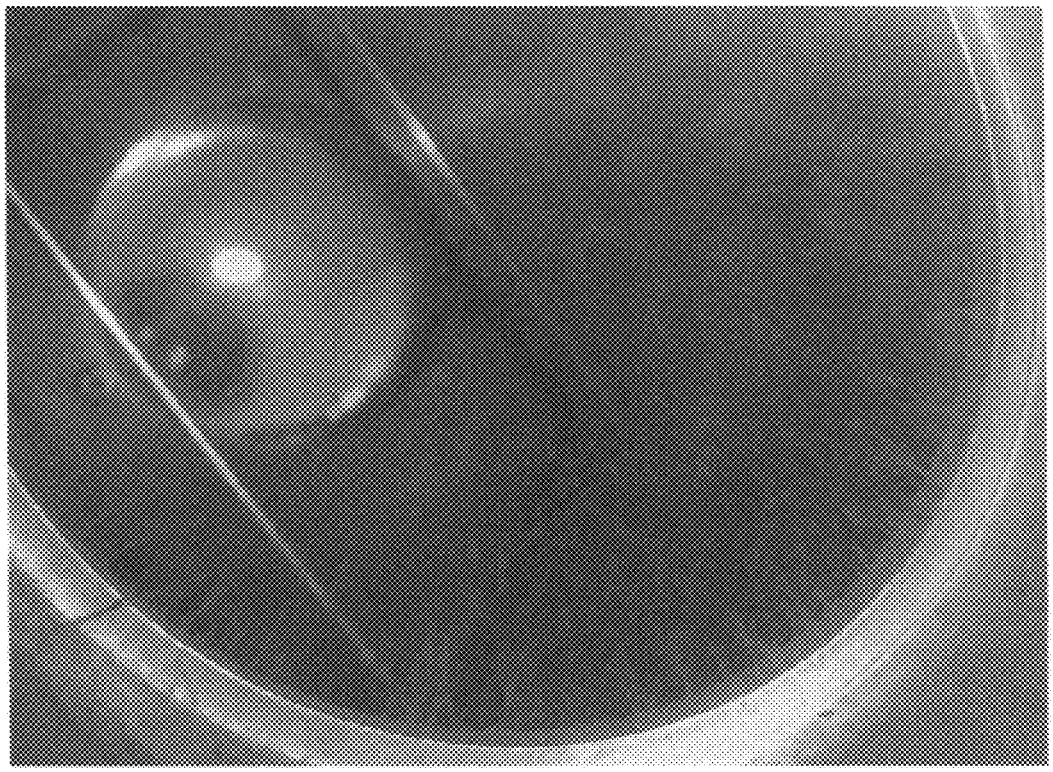
FIG. 18 is a picture showing aggregates of nanometric filamentary structures flowing in a gaseous phase in an apparatus for depositing nanometric filamentary structures according to another preferred embodiment of the present invention, wherein the structures are single-wall carbon nanotubes.

When the density of suspended carbon nanotubes reached a critical density, after about one or two minutes, the current sharply rose since the suspended carbon nanotubes underwent an aggregation process and formed small aggregates of carbon nanotubes (having a length in the centimeter range (see FIG. 18)). Subsequently, macroscopic assemblies of single-wall carbon nanotubes were formed providing large filaments that have natural tendency to bridge the electrodes of the depositing apparatus. The length of these filaments formed is limited by the gap between the electrodes 130 and 136 (about 10 cm as shown in FIG. 19). These filaments were then rolled-up on the central electrode since this electrode is rotated to form the entanglement of rolled up filaments as shown in FIGS. 9 and 10. The assembly of nanometric filamentary structures (single-wall carbon nanotubes in the present example) had a foamy aspect. In the present example, the rotation speed was about 30 RPM. The rotation speed is preferably slow enough in order to optimize the rolling-up of the filaments, which have a formation time scale in the range of second(s). This time scale will vary in accordance with the gap between the electrodes, the density of nanotubes in the gaseous phase and in the elongated member or depositing chamber, and the voltage applied.

The efficiency of the process may vary in accordance with the length of the depositing chamber, the flow rate, the nanotube production rate, the nanotube purity, the rotation speed and of the electric field applied. The particles that are not deposited will flow to the exhaust before being trapped in a filter (not shown) and will be lost from the production point of view. In the present example, the depositing efficiency reached more than 98% with a depositing length of 60 cm, a flow rate of 10 SLM and a production rate of about 0.2 g/hour.

Figure 20:
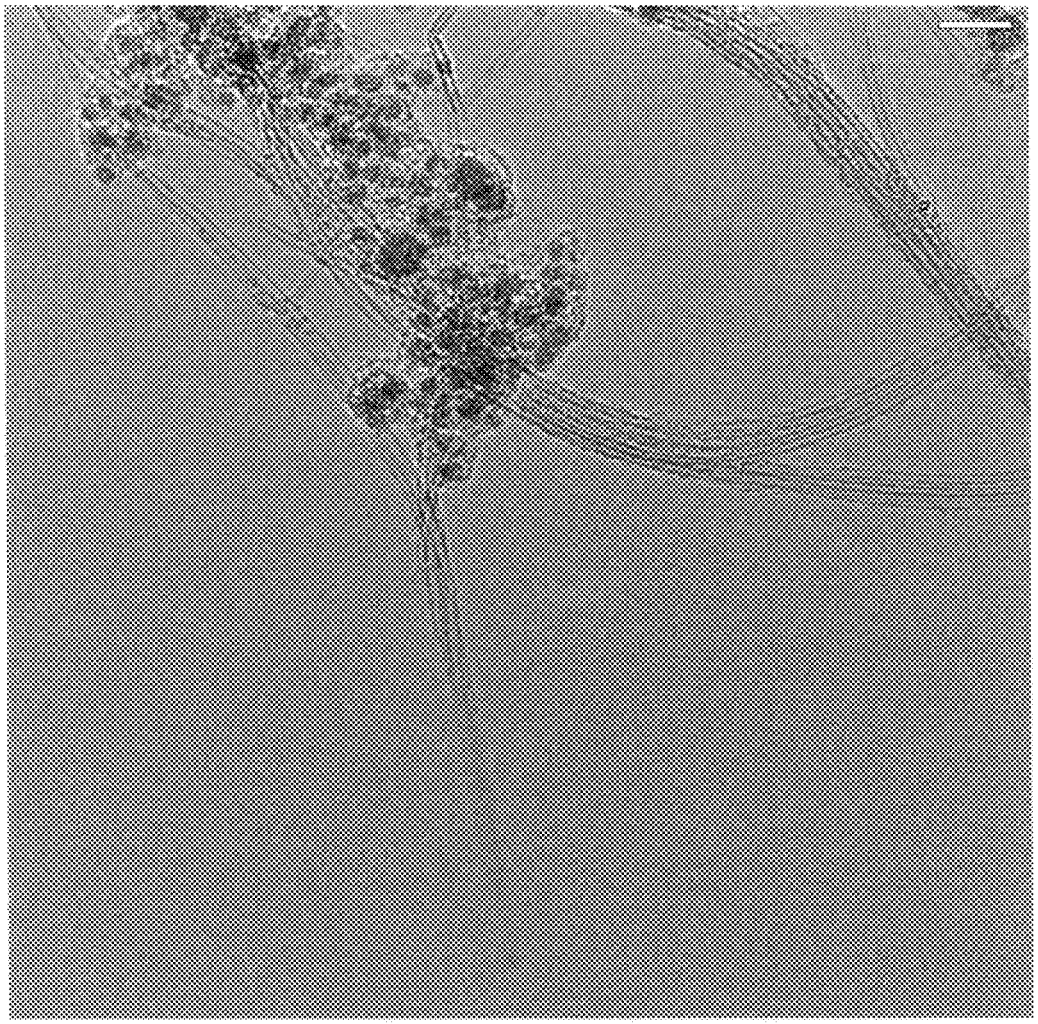
FIG. 20 is a Transmission Electron Microscope (TEM) image of deposited nanometric filamentary structures obtained via a method and an apparatus for depositing nanometric filamentary structures according to preferred embodiments of the present invention, wherein the deposited structures are single-wall carbon nanotubes.
Figure 21:
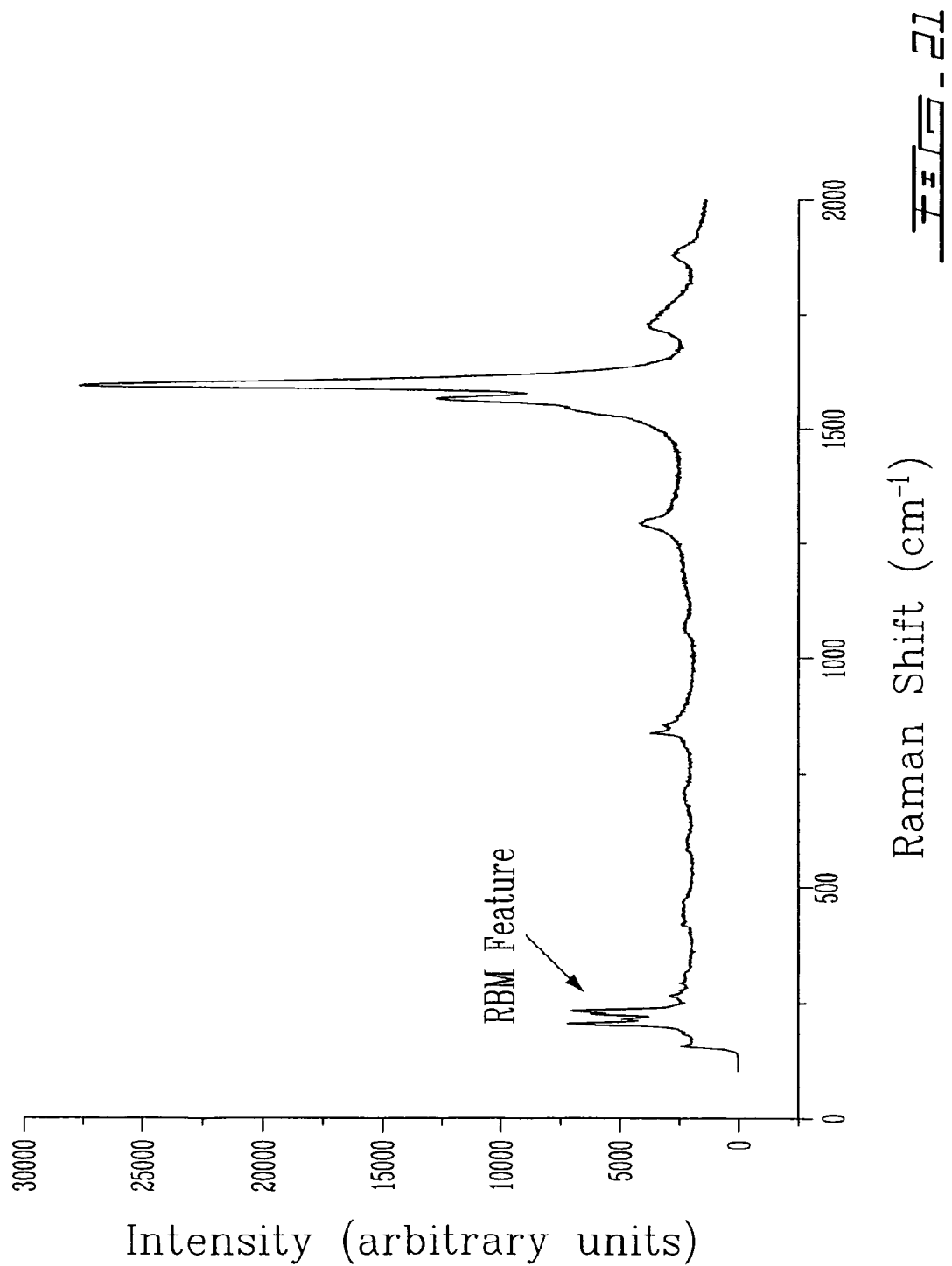
FIG. 21 is a Raman spectrum of nanometric filamentary structures recovered via a method and an apparatus for depositing nanometric filamentary structures according to preferred embodiments of the present invention, wherein the deposited structures are single-wall carbon nanotubes.
Figure 22:
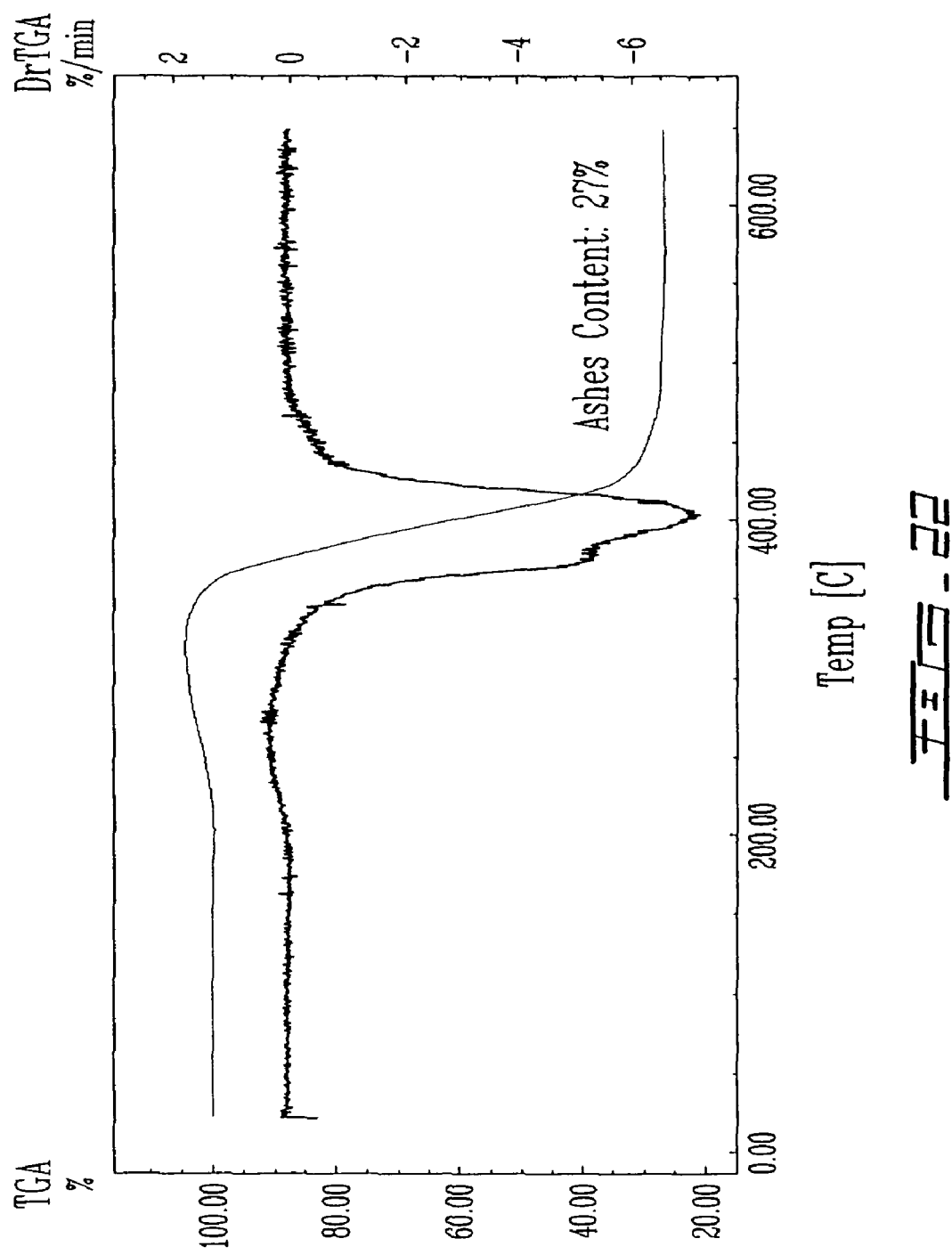
FIG. 22 is a graph of a Thermogravimetric Analysis (TGA) of the nanometric filamentary structures analyzed in FIG. 21.
Figure 23:
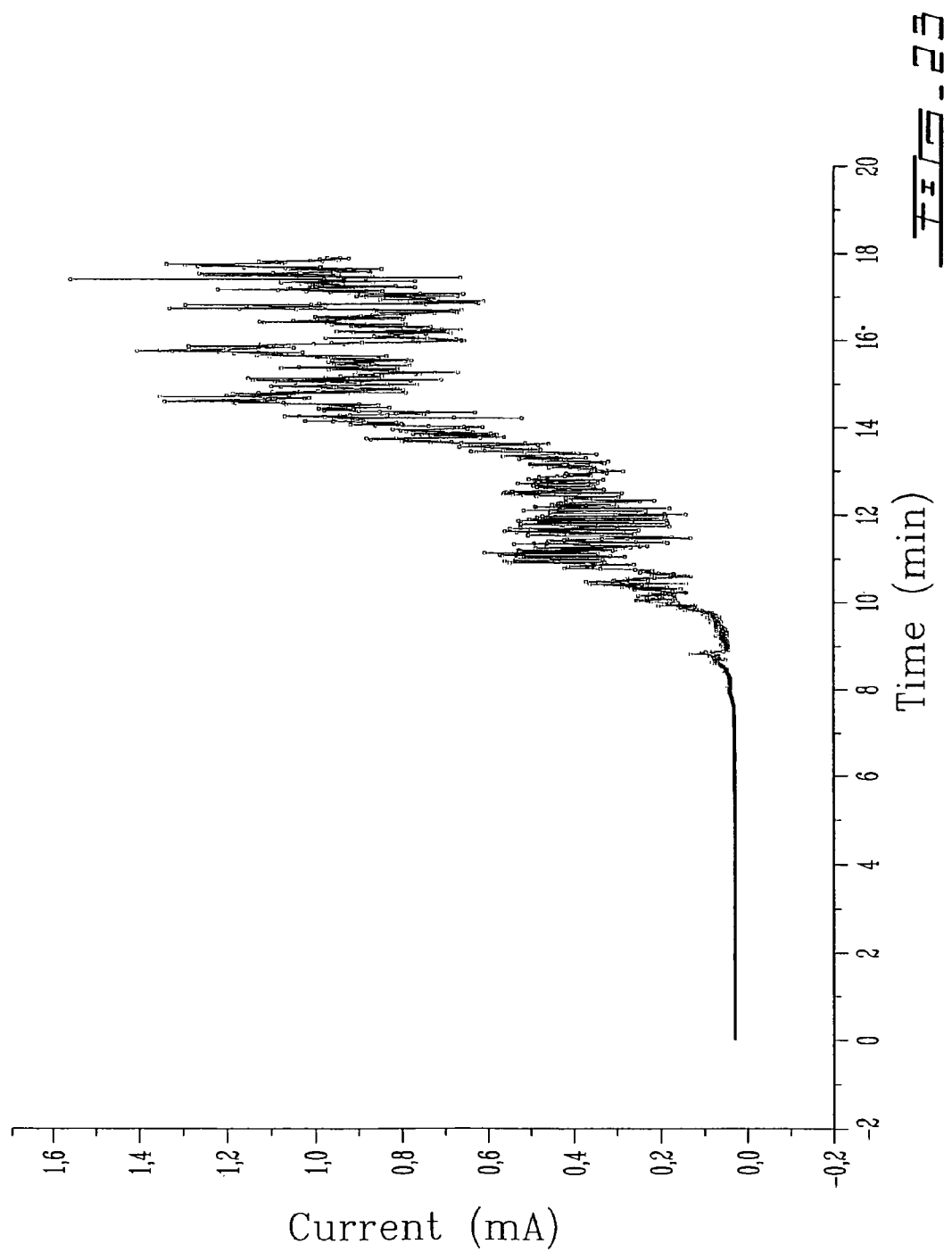
FIG. 23 is a graph showing change of current over time obtained when carrying out a method for monitoring the production of nanometric filamentary structures according to another preferred embodiment of the present invention, wherein the structures are single-wall carbon nanotubes.

Some analyses were carried out on the deposited single-wall carbon nanotubes obtained. In fact, a transmission electron microscope (TEM) (FIG. 20), Raman spectroscopy (FIG. 21) and thermogravimetric analysis (TGA) (FIG. 22) clearly indicated the presence of single-wall carbon nanotubes. These analyses also confirmed the purity of the nanotubes deposited on the electrodes. Indeed, the TEM image (see FIG. 20) of the entanglement of filaments rolled up around an electrode (see FIGS. 9 and 10) shows single-wall carbon nanotubes having a diameter of the order of one nanometer and organized in small bundles having a diameter of about 5 nm. Amorphous carbon and iron catalyst nanoparticles produced in the synthesis process with the carbon nanotubes can also be seen. The Raman spectrum shown in FIG. 21 and obtained with a laser emitting at 785 nm also confirms the presence of single-wall carbon nanotubes since the typical radial breathing mode (RBM) feature in the low frequency range of such nanotubes is observed in the latter figure. The overall purity for the deposited sample of single-wall carbon nanotubes was evaluated with the TGA of FIG. 22 at more than 50% weight with the following experimental parameters: ramping rate of 5° C./min, gas flow of 55 sccm, sample mass of 4 mg, gas composition of 95% $N_2$ and 5% $O_2$. The ashes content, which is frequently used as an indicator of the deposit purity, had a value of 27% as indicated in FIG. 22. The density of the macroscopic assembly of single-wall carbon nanotubes thus obtained was about 5 mg/cm$^3$.

Example 3

Monitoring the Production of Nanometric Filamentary Structures

This example was carried out using an apparatus similar to the apparatus shown in FIG. 13. More particularly, the apparatus for monitoring the production of nanometric filamentary structures was mounted on an apparatus for depositing nanometric filamentary structures similar to the apparatus shown in FIG. 12. The apparatus for depositing nanometric filamentary structures was disposed downstream of a plasma torch for producing single-wall carbon nanotubes as shown in FIG. 1 and as described in Example 2. In the present example, the particular behavior of the suspended carbon nanotubes in a gaseous phase, when submitted to an electric field, was used in order to detect and monitor the production of nanotubes.

The optimal conditions for the synthesis of single-wall carbon nanotubes are varying when modifications are done in the plasma used in the synthesis process. For example, if the cooling parameters of the plasma torch are considerably modified, iterations of the experimental parameters are required to find the optimal conditions. By using the monitoring apparatus similar to the apparatus shown in FIG. 13, many iterations of the experimental parameters in the same experiment we rapidly achieved until the optimal conditions for nanotube synthesis were reached: i.e. when the mean current flowing between the electrodes of the monitoring apparatus was maximized and large filaments were formed in the gaseous phase for the same production rate. Thus, the apparatus and method used permitted to rapidly find appropriate conditions for the synthesis of the nanotubes. Moreover, it has been possible to make these modifications in real time and without the requirement of carrying out several experiments before obtaining appropriate conditions. It can be seen from FIG. 23 that the current level was very low before 8 minutes since the synthesis conditions were too bad to form carbon nanotubes. From 8 minutes to 13 minutes, they have been improved by varying the experimental parameters such as the inert gas flow and the ratio of ferrocene on ethylene injected in the plasma torch. At this stage, a low density of small nanotubes aggregates filaments (as in FIG. 18) has appeared but it was only after 13 minutes that the optimal conditions have been reached It was in fact, the formation of large filaments (as in FIG. 19) and a high current in the monitoring device.

Figure 24A:
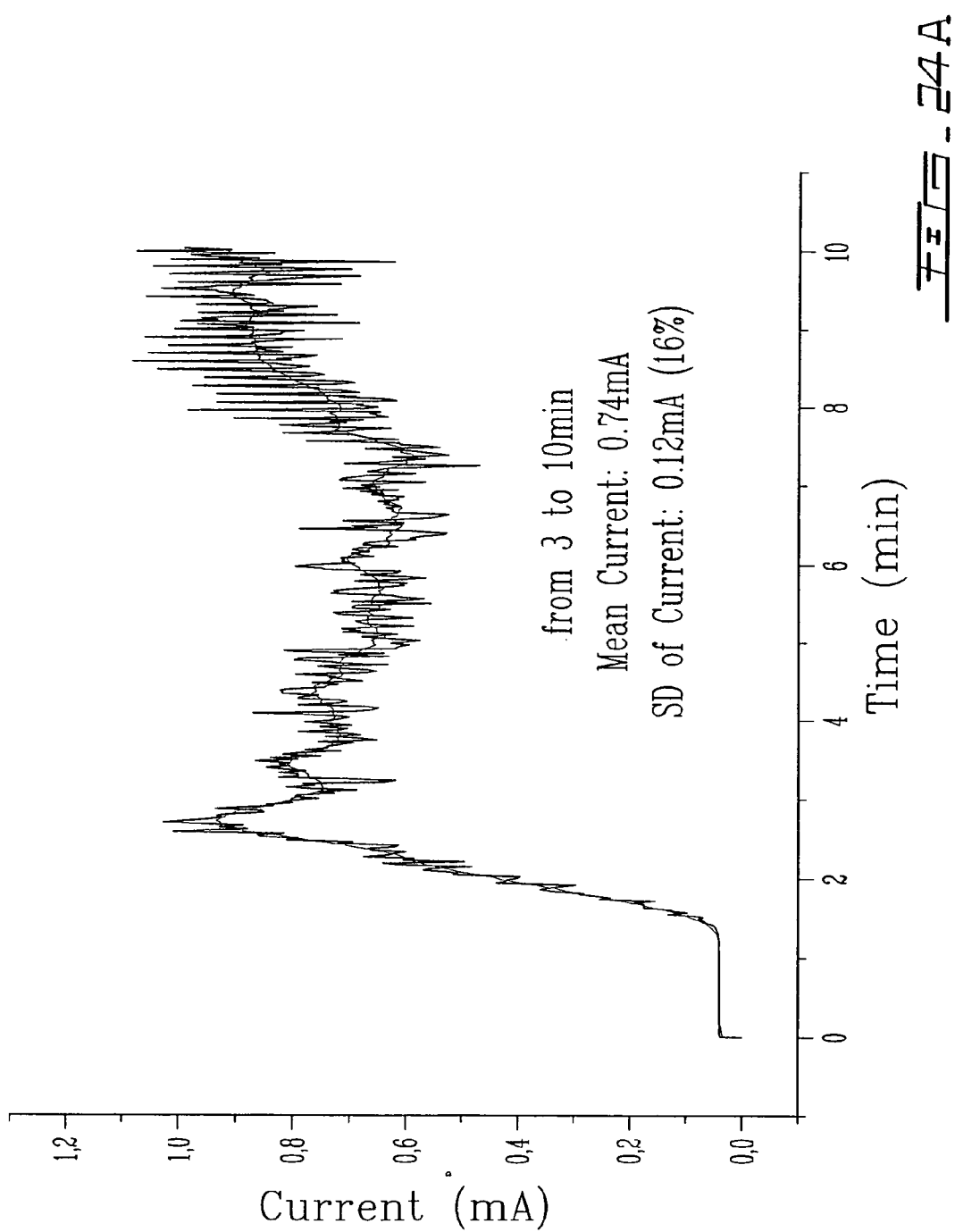
FIG. 24A a is a graph showing change of current over time obtained when carrying out a method for monitoring the production of nanometric filamentary structures according to another preferred embodiment of the present invention, wherein the structures are single-wall carbon nanotubes and wherein the graph shows the current behavior obtained during a normal and efficient production of single-wall carbon nanotubes.
Figure 24B:
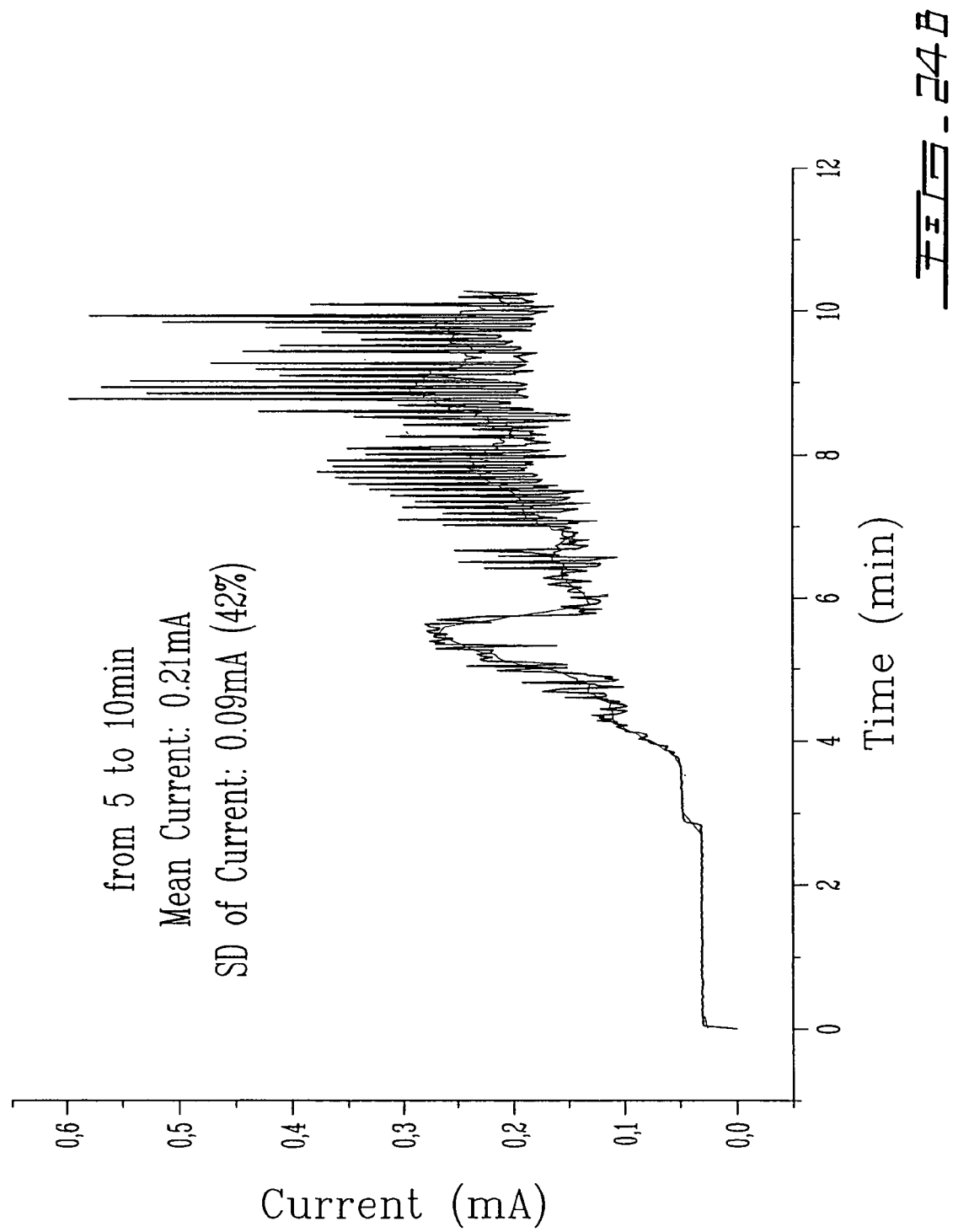
FIG. 24B a is a graph showing change of current over time obtained when carrying out a method for monitoring the production of nanometric filamentary structures according to another preferred embodiment of the present invention, wherein the structures are single-wall carbon nanotubes and wherein the graph shows the current behavior obtained during a problematic and inefficient production of single-wall carbon nanotubes.

Once the parameters for the synthesis of nanotubes are optimized, the production can be monitored with the same device in order to make sure that the quality of the production is maintained over the time and at each new experiment. A higher mean current was generally observed for a normal production (see FIG. 24A)) where there was a good quality carbon nanotube deposit in comparison with a problematic production (see FIG. 24B)). The ratio of the standard deviation (SD in FIG. 24) on the mean current, which is expressed in percentage in the FIG. 8, was greater when the relative amount of nanotubes was low. This effect is seen in FIGS. 24A and 24B, where the ratio of the standard deviation of the current on its mean value was respectively varying from 16% to 42% for a normal and problematic production.

Figure 25:
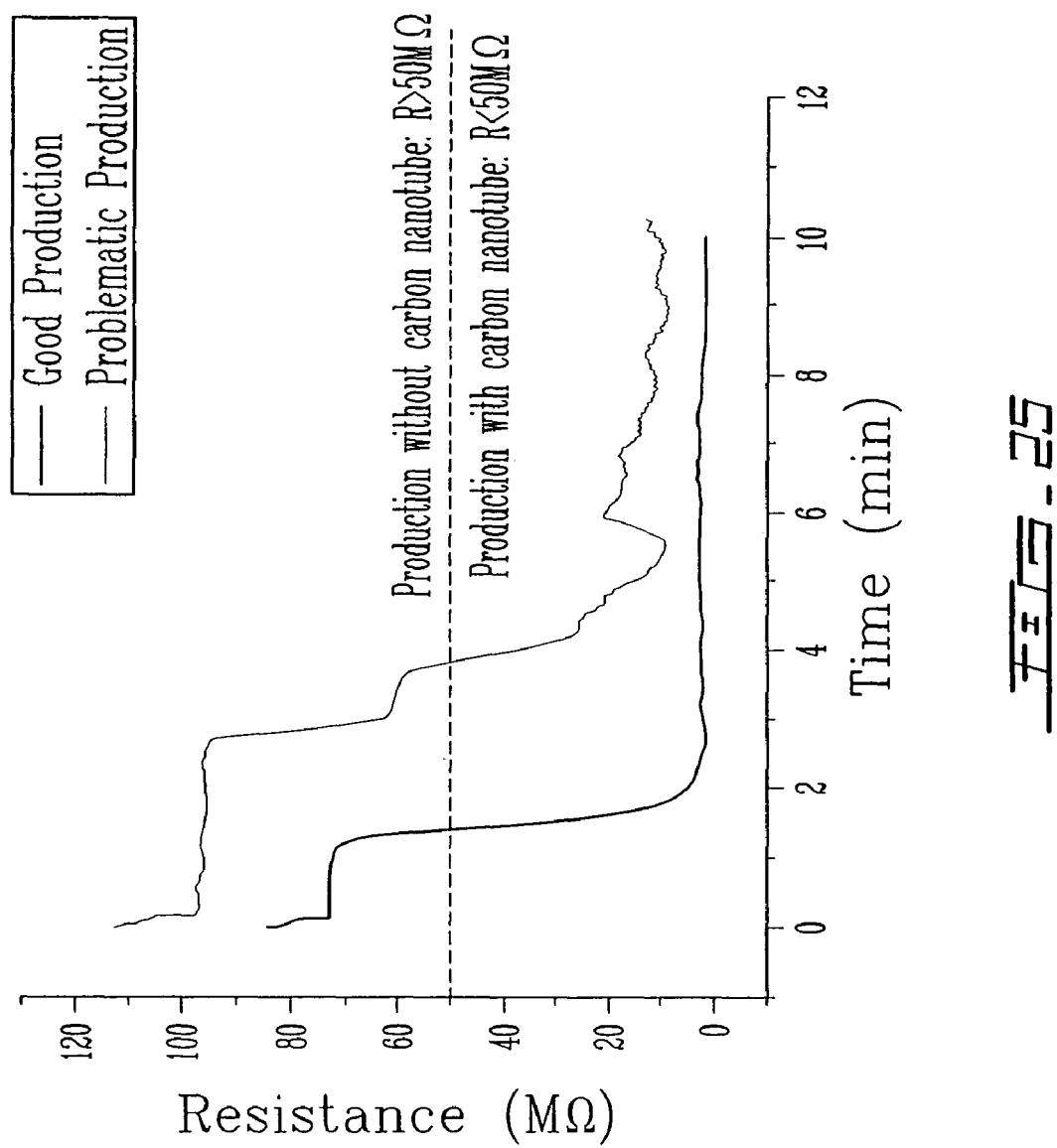
FIG. 25 is a graph showing change of the resistance of the monitoring apparatus over time, obtained from the graphs of FIGS. 24A and 24B.
Figure 26:
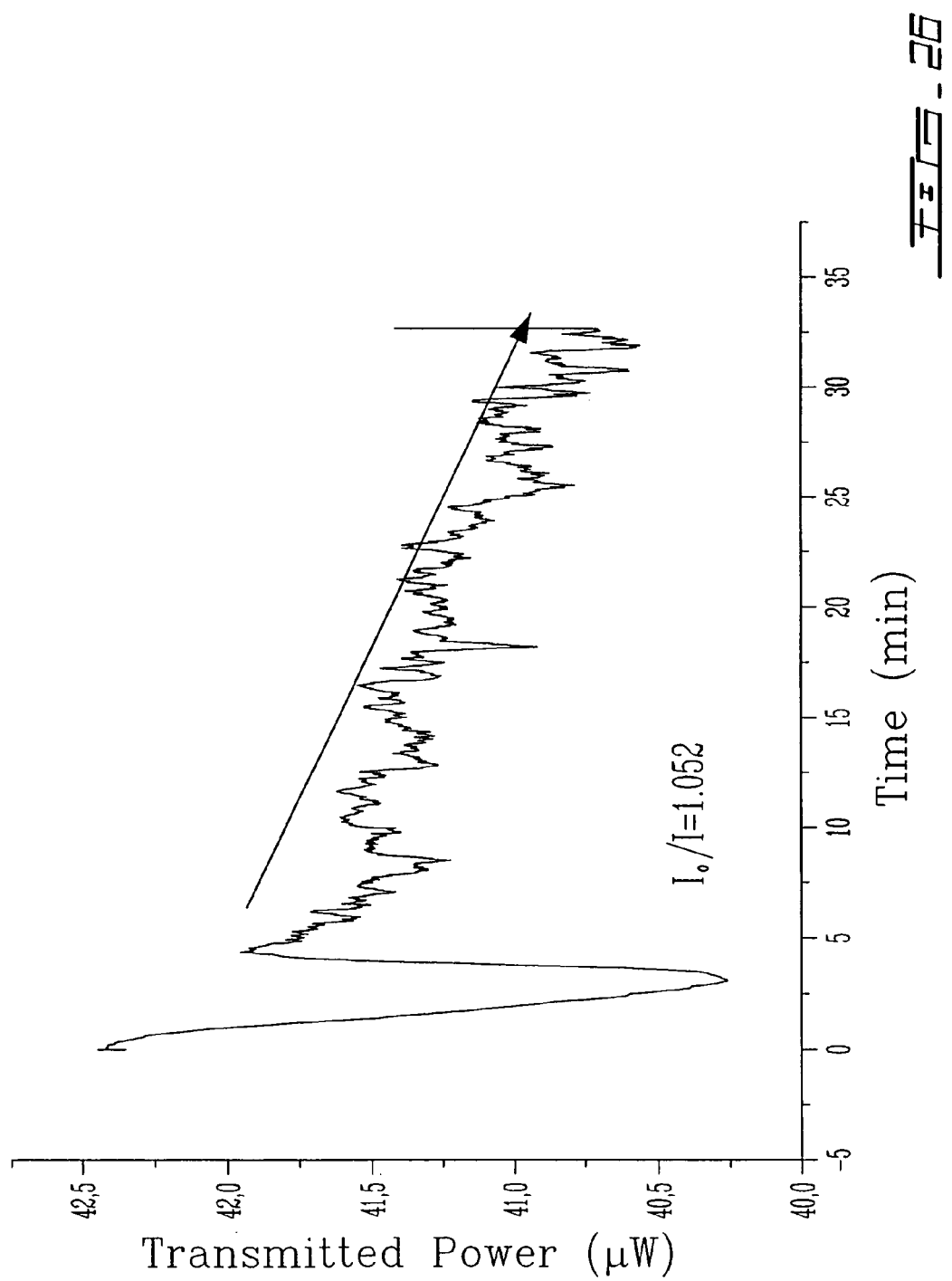
FIG. 26 is an optical absorption graph representing the transmitted power as a function of time and obtained with an optical device during a method for monitoring the production of nanometric filamentary structures according to another preferred embodiment of the present invention, wherein the optical device comprises a laser He—Ne 632.8 nm and the structures are single-wall carbon nanotubes.

From the current behavior, the resistance between the electrodes of the monitoring chamber was also calculated. In FIG. 25, the resistance was calculated for the good and problematic production of carbon nanotubes of FIGS. 24A and 24B in order to show the lower resistance reached in the normal production. The sharp rise in current at the onset of the aggregation process has been measured by differentiating the current with respect to the time. The higher slope of FIG. 24A in comparison with FIG. 24B has been linked to the difference in the current rise for a normal and problematic production of carbon nanotubes.

Example 4

Deposition of Nanometric Filamentary Structures Using an Ionization Unit

In this example, an apparatus for depositing nanometric filamentary nanostructures provided with an ionization unit was used. The apparatus used for the purpose of the present example was similar to the depositing apparatus schematically represented in FIG. 14 and it was provided with an ionization unit similar to the one schematically represented in FIG. 15. The ionization unit used comprises of a set of electrodes between which a current flows (see FIG. 15) in order to ionize the nanotube particles carried in the gaseous phase. As shown in FIG. 15, the electrode of the ionization unit was supplied with a low power Tesla coil power supply(<30 Watts), which is giving a high frequency (~0.5 MHz) and high voltage (10-50 kV) signal. It was observed that the use of an ionization unit in a method or apparatus for depositing nanometric filamentary structures as detailed in Example 2 permits to improve the efficiency of such a method or apparatus for depositing the nanometric filamentary structures. Indeed, the depositing efficiency was increased from about 70% to more than 90% for the same production parameters (nanotube production rate and purity) as described in Example 2, even if the voltage applied on the electrode of the depositing apparatus has been lowered from 3000V to 2000V. By adding an ionization unit, the nanotubes have thus been deposited at a lower electrical power in the depositing apparatus. It may be quite advantageous to minimize the electric power supply in the depositing apparatus, since some high power may cause damage to the nanotubes produced.

All the documents that are referred to in the present document are hereby incorporated by reference.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

What is claimed is:

1. A method for monitoring the production of nanometric filamentary structures, the method comprising:
passing a gaseous phase comprising nanometric filamentary structures through a space defined between at least two electrodes generating an electric field for causing an increase of current between said electrodes; and
analyzing behavior of said current over a predetermined period of time and/or analyzing at least one of the size, density and shape of said nanometric filamentary structures or aggregates thereof present in said gaseous phase,
wherein said nanometric filamentary structures comprise nanostructures chosen from nanowires, nanorods, nanofibers, nanoribbons, and nanotubes of a member chosen from C, BN, B, Si, Ge, Bi, Sn, Te, Se, Hg, $Si_3N_4$, $V_2O_3$, $MX_2$ wherein M is Ti, Zr, Hf, Nb, Ta, Mo, W or Re and X is S, Se or Te, InP, InAs, GaN, GaP, GaAs, $Ga_2O_3$, ZnO, $In_2O_3$, $Na_2V_3O_7$, $Al_2O_3$, $B_2O_3$, MgO, CdO, $SiO_2$, $SnO_2$, CuO, $(SN)_x$, $Cu_2S$, $B_xC_yN_z$, $NiCl_2$, InS, ZnS, ZnSe, CdS, CdSe, $Ag_2Se$, SiC, $B_4C$, $M_2MoX_6$ wherein M is Li or Na and X is Se or Te, coated structures thereof and mixtures thereof.

2. The method of claim 1, wherein at least one of the density and shape of nanometric filamentary structures or aggregates thereof is analyzed, the analysis being carried out by analyzing the optical absorption of the nanometric filamentary structures or aggregates thereof present in said gaseous phase.

3. The method of claim 1, wherein the behavior of said current is analyzed and wherein the analysis of the behavior of the current is carried out on real time while passing said gaseous phase through said space by monitoring the change of at least one of said current over time and a resistance over time.

4. The method of claim 1, wherein the behavior of said current is analyzed and wherein the analysis of the behavior of said current is carried out by analyzing the derivative of the current as a function of time.

5. The method of claim 1, wherein the behavior of said current is analyzed and wherein the analysis of the behavior of said current is carried out by analyzing the mean intensity of the current as a function of time and its standard deviation as a function of time.

6. The method of claim 1, wherein the behavior of said current is analyzed and wherein the analysis of the behavior of said current is carried out by analyzing the resistance between said electrodes as a function of time.

7. The method of claim 2, wherein the behavior of said current is analyzed and wherein said analysis is carried out by analyzing at least one of the derivative of the current as a function of time, the mean intensity of the current as a function of time and its standard deviation as a function of time, and the resistance between said electrodes as a function of time.

8. The method of claim 1, wherein the density of nanometric filamentary structures or aggregates thereof is analyzed, the analysis being carried out by analyzing the optical absorption of the nanometric filamentary structures or aggregates thereof present in said gaseous phase while said gaseous phase in present in said electric field.

9. The method of claim 1, wherein the density of nanometric filamentary structures is analyzed, the analysis being carried out by analyzing the optical absorption of the nanometric filamentary structures present in said gaseous phase when said gaseous phase is upstream of said electric field.

10. The method of claim 1, wherein the density of nanometric filamentary structures or aggregates thereof is analyzed, the analysis being carried out in real time by analyzing the optical absorption of the nanometric filamentary structures or aggregates thereof present in said gaseous phase while said gaseous phase in present in said electric field or upstream of said electric field.

11. The method of claim 2, wherein the density of the nanometric filamentary structures is measured by analyzing the optical absorption.

12. The method of claim 1, wherein the analysis of at least one of the size, density and shape of the nanometric filamentary structures or aggregates thereof is carried out by monitoring the nanometric filamentary structures or aggregates thereof with a camera.

13. The method of claim 1, wherein said method further comprises the step of detecting the presence of nanometric filamentary structures within said gaseous phase before introducing said gaseous phase between said electrodes.

14. The method of claim 1, wherein said nanometric filamentary structures comprise single-wall carbon nanotubes.

15. The method of claim 2, wherein said nanometric filamentary structures comprise single-wall carbon nanotubes.

16. The method of claim 3, wherein the behavior of said current is analyzed and wherein the analysis of the behavior of said current is carried out by analyzing the derivative of the current as a function of time.

17. A method for monitoring the production of nanometric filamentary structures, the method comprising:
passing a gaseous phase comprising nanometric filamentary structures through a space defined between at least two electrodes generating an electric field for causing an increase of current between said electrodes; and
analyzing behavior of said current over a predetermined period of time and/or analyzing at least one of the size, density and shape of said nanometric filamentary structures or aggregates thereof present in said gaseous phase,
wherein the behavior of said current is analyzed and wherein said analysis is carried out by analyzing at least one of the derivative of the current as a function of time, the mean intensity of the current as a function of time and its standard deviation as a function of time, and the resistance between said electrodes as a function of time.

18. The method of claim 17, wherein said nanometric filamentary structures comprise nanostructures chosen from nanowires, nanorods, nanofibers, nanoribbons, and nanotubes of a member chosen from C, BN, B, Si, Ge, Bi, Sn, Te, Se, Hg, $Si_3N_4$, $V_2O_3$, $MX_2$ wherein M is Ti, Zr, Hf, Nb, Ta, Mo, W or Re and X is S, Se or Te, InP, InAs, GaN, GaP, GaAs, $Ga_2O_3$, ZnO, $In_2O_3$, $Na_2V_3O_7$, $Al_2O_3$, $B_2O_3$, MgO, CdO, $SiO_2$, $SnO_2$, CuO, $(SN)_x$, $Cu_2S$, $B_xC_yN_z$, $NiCl_2$, InS, ZnS, ZnSe, CdS, CdSe, $Ag_2Se$, SiC, $B_4C$, $M_2MoX_6$ wherein M is Li or Na and X is Se or Te, coated structures thereof and mixtures thereof.

19. The method of claim 17, wherein said nanometric filamentary structures comprise single-wall carbon nanotubes.

20. The method of claim 17, wherein the behavior of said current is analyzed and wherein the analysis of the behavior of said current is carried out by analyzing the derivative of the current as a function of time.

21. The method of claim 17, wherein the behavior of said current is analyzed and wherein the analysis of the behavior of said current is carried out by analyzing the mean intensity of the current as a function of time and its standard deviation as a function of time.

22. The method of claim 17, wherein the behavior of said current is analyzed and wherein the analysis of the behavior of said current is carried out by analyzing the resistance between said electrodes as a function of time.

23. The method of claim 17, wherein the behavior of said current is analyzed and wherein the analysis of the behavior of the current is carried out on real time while passing said gaseous phase through said space by monitoring the change of at least one of said current over time and a resistance over time.

24. A method for monitoring the production of nanometric filamentary structures, the method comprising:
passing a gaseous phase comprising nanometric filamentary structures through a space defined between at least two electrodes generating an electric field for causing an increase of current between said electrodes; and
analyzing behavior of said current over a predetermined period of time and/or analyzing at least one of the size, density and shape of said nanometric filamentary structures or aggregates thereof present in said gaseous phase,
wherein the behavior of said current is analyzed and wherein the analysis of the behavior of the current is carried out on real time while passing said gaseous phase through said space by monitoring the change of at least one of said current over time and a resistance over time,
and wherein said analysis is compared with a standard graph in order to determine the presence or absence of said nanometric filamentary structures and/or to evaluate the quality of said nanometric filamentary structures.

25. The method of claim 24, wherein the behavior of said current is analyzed by analyzing at least one of the derivative of the current as a function of time, the mean intensity of the current as a function of time and its standard deviation as a function of time, and the resistance between said electrodes as a function of time.

26. The method of claim 24, wherein said nanometric filamentary structures comprise single-wall carbon nanotubes.

27. A method for monitoring the production of nanometric filamentary structures, the method comprising:
passing a gaseous phase comprising nanometric filamentary structures through a space defined between at least two electrodes generating an electric field for causing an increase of current between said electrodes; and
analyzing behavior of said current over a predetermined period of time and/or analyzing at least one of the size, density and shape of said nanometric filamentary structures or aggregates thereof present in said gaseous phase,
wherein the behavior of said current is analyzed and wherein the analysis of the behavior of said current is carried out by analyzing the derivative of the current as a function of time.

28. The method of claim 27, wherein said nanometric filamentary structures comprise nanostructures chosen from carbon nanowires, carbon nanorods, carbon nanofibers, carbon nanoribbons, and carbon nanotubes, coated structures thereof and mixtures thereof.

29. The method of claim 27, wherein said nanometric filamentary structures comprise single-wall carbon nanotubes.

30. The method of claim 28, wherein the analysis of the behavior of the current is carried out on real time while passing said gaseous phase through said space by monitoring the change of said current over time.

31. A method for monitoring the production of nanometric filamentary structures, the method comprising:
passing a gaseous phase comprising nanometric filamentary structures through a space defined between at least two electrodes generating an electric field for causing an increase of current between said electrodes; and
analyzing behavior of said current over a predetermined period of time and/or analyzing at least one of the size, density and shape of said nanometric filamentary structures or aggregates thereof present in said gaseous phase,
wherein at least one of the density and shape of nanometric filamentary structures or aggregates thereof is analyzed, the analysis being carried out by analyzing the optical absorption of the nanometric filamentary structures or aggregates thereof present in said gaseous phase,
and wherein the behavior of said current is analyzed, said analysis being carried out by analyzing at least one of the derivative of the current as a function of time, the mean intensity of the current as a function of time and its standard deviation as a function of time, and the resistance between said electrodes as a function of time.

32. The method of claim 31, wherein said nanometric filamentary structures comprise nanostructures chosen from carbon nanowires, carbon nanorods, carbon nanofibers, carbon nanoribbons, and carbon nanotubes, coated structures thereof and mixtures thereof.

33. The method of claim 32, wherein the analysis of the behavior of said current is carried out by analyzing the derivative of the current as a function of time.

34. The method of claim 32, wherein the analysis of the behavior of the current is carried out on real time while passing said gaseous phase through said space by monitoring the change of said current over time.

* * * * *